United States Patent
Krosky et al.

(10) Patent No.: US 10,888,791 B2
(45) Date of Patent: Jan. 12, 2021

(54) OUTPUT PRODUCTION

(71) Applicants: Ronald Charles Krosky, Sparks Glencoe, MD (US); Brendan Edward Clark, Rocky River, OH (US)

(72) Inventors: Ronald Charles Krosky, Sparks Glencoe, MD (US); Brendan Edward Clark, Rocky River, OH (US)

( * ) Notice: Subject to any disclaimer, the term of this patent is extended or adjusted under 35 U.S.C. 154(b) by 0 days.

(21) Appl. No.: 16/048,313

(22) Filed: Jul. 29, 2018

(65) Prior Publication Data
US 2018/0353863 A1 Dec. 13, 2018

Related U.S. Application Data

(63) Continuation of application No. 13/194,946, filed on Jul. 30, 2011, now Pat. No. 10,046,241.

(60) Provisional application No. 61/409,027, filed on Nov. 1, 2010.

(51) Int. Cl.
*A63F 13/803* (2014.01)
*A63F 13/67* (2014.01)
*A63F 13/69* (2014.01)

(52) U.S. Cl.
CPC ............ *A63F 13/803* (2014.09); *A63F 13/67* (2014.09); *A63F 13/69* (2014.09); *A63F 2300/8017* (2013.01)

(58) Field of Classification Search
CPC ........ A63F 13/803; A63F 13/67; A63F 13/69; A63F 2300/8017
See application file for complete search history.

(56) References Cited

U.S. PATENT DOCUMENTS

| | | | | |
|---|---|---|---|---|
| 4,148,485 A | * | 4/1979 | Rains | A63F 13/005 463/6 |
| 4,500,868 A | * | 2/1985 | Tokitsu | B60K 35/00 180/282 |
| 5,269,687 A | * | 12/1993 | Mott | A63F 13/10 434/69 |
| 5,286,099 A | * | 2/1994 | Fujita | B60T 13/745 303/125 |
| 5,366,376 A | * | 11/1994 | Copperman | A63F 13/005 434/69 |
| 5,368,484 A | * | 11/1994 | Copperman | A63F 13/005 434/69 |
| 5,445,024 A | * | 8/1995 | Riley, Jr. | G01P 1/127 346/7 |
| 5,607,308 A | * | 3/1997 | Copperman | A63F 13/005 434/62 |
| 5,707,237 A | * | 1/1998 | Takemoto | A63F 13/08 434/69 |

(Continued)

OTHER PUBLICATIONS

Shaun Mcinnis; Gran Turismo 5 Update—Dynamic Weather, Rally Courses, and Playing on Your Computer—PlayStation 3 Previews at GameSpot; 9-16-201-; 5 pages, Gamespot.

*Primary Examiner* — Omkar A Deodhar
*Assistant Examiner* — Matthew D Hoel

(57) ABSTRACT

Systems, methods, and other embodiments associated with output production are described. One example system comprises an analysis component configured to analyze a data set to produce an evaluation result. The system also comprises a production component configured to produce a rendered output based, at least in part, on the evaluation result, where the rendered output is stored in a computer-readable medium.

18 Claims, 22 Drawing Sheets

(56) References Cited

U.S. PATENT DOCUMENTS

| | | | |
|---|---|---|---|
| 5,921,780 A * | 7/1999 | Myers | G09B 9/05 434/29 |
| 6,053,815 A * | 4/2000 | Hara | A63F 13/08 463/46 |
| 6,080,063 A * | 6/2000 | Khosla | A63F 13/10 463/42 |
| 6,146,143 A * | 11/2000 | Huston | G09B 9/05 345/620 |
| 6,174,186 B1 * | 1/2001 | Hashiguchi | G06K 7/0013 439/260 |
| 6,200,138 B1 * | 3/2001 | Ando | A63F 13/10 434/61 |
| 6,417,854 B1 * | 7/2002 | Isowaki | A63F 13/10 345/473 |
| 6,422,939 B1 * | 7/2002 | Koyama | A63F 13/10 463/6 |
| 6,557,041 B2 * | 4/2003 | Mallart | A63F 13/12 709/231 |
| 6,632,138 B1 * | 10/2003 | Serizawa | A63F 13/005 463/6 |
| 6,652,376 B1 * | 11/2003 | Yoshida | A63F 13/10 463/6 |
| 6,726,567 B1 * | 4/2004 | Khosla | A63F 13/10 463/42 |
| 7,090,577 B2 * | 8/2006 | Serizawa | A63F 13/005 463/6 |
| 7,211,000 B2 * | 5/2007 | Jutzi | A63F 13/12 463/40 |
| 7,330,769 B2 * | 2/2008 | Comair | A63F 13/10 700/94 |
| 7,454,714 B2 * | 11/2008 | Totman | G06F 3/0482 715/810 |
| 7,601,055 B2 * | 10/2009 | Eika | A63F 13/10 463/6 |
| 7,674,167 B2 * | 3/2010 | Ohta | A63F 13/10 463/6 |
| 7,736,220 B2 * | 6/2010 | Mori | A63F 13/10 463/6 |
| 7,744,451 B2 * | 6/2010 | Tipping | A63F 13/10 463/6 |
| 7,749,057 B2 * | 7/2010 | Tipping | A63F 13/10 463/6 |
| 7,785,178 B2 * | 8/2010 | Tipping | A63F 13/10 463/6 |
| 7,837,544 B2 * | 11/2010 | Tipping | A63F 13/10 463/6 |
| 7,892,078 B2 * | 2/2011 | Tipping | G01C 21/00 463/7 |
| 7,953,521 B2 * | 5/2011 | Tipping | G05B 13/0265 273/442 |
| 8,012,005 B2 * | 9/2011 | Ohta | A63F 13/10 463/6 |
| 8,133,115 B2 * | 3/2012 | Campbell | A63F 13/10 463/31 |
| 8,167,693 B2 * | 5/2012 | Fujii | A63F 13/10 463/6 |
| 8,224,031 B2 * | 7/2012 | Saito | G06K 9/6205 348/187 |
| 8,371,915 B2 * | 2/2013 | Tipping | A63F 13/10 463/6 |
| 8,393,944 B2 * | 3/2013 | Tipping | A63F 13/803 463/7 |
| 8,425,293 B2 * | 4/2013 | Tipping | A63F 13/10 463/6 |
| 8,694,236 B2 * | 4/2014 | Takagi | G01S 17/931 701/300 |
| 9,174,652 B2 * | 11/2015 | Chang | B60W 50/14 |
| 9,643,086 B2 * | 5/2017 | Tipping | A63F 13/10 |
| 2002/0072418 A1 | 6/2002 | Masuyama et al. | |
| 2002/0169013 A1 * | 11/2002 | Serizawa | A63F 13/12 463/6 |
| 2003/0037156 A1 * | 2/2003 | Mallart | A63F 13/12 709/231 |
| 2003/0045956 A1 * | 3/2003 | Comair | H04R 5/02 700/94 |
| 2003/0130031 A1 * | 7/2003 | Yoshida | A63F 13/10 463/23 |
| 2003/0153374 A1 * | 8/2003 | Gilmore | G07F 17/32 463/6 |
| 2004/0103004 A1 * | 5/2004 | Wahlbin | G06Q 10/10 705/4 |
| 2004/0103006 A1 * | 5/2004 | Wahlbin | G06Q 40/04 705/4 |
| 2004/0224740 A1 * | 11/2004 | Ball | A63F 13/10 463/6 |
| 2004/0235543 A1 * | 11/2004 | Eika | A63F 13/10 463/6 |
| 2006/0143285 A1 * | 6/2006 | St-Denis | G06Q 30/02 709/217 |
| 2006/0148546 A1 * | 7/2006 | Inoue | A63F 13/57 463/6 |
| 2006/0246972 A1 * | 11/2006 | Thomas | A63F 13/10 463/4 |
| 2006/0246973 A1 * | 11/2006 | Thomas | A63F 13/42 463/4 |
| 2007/0060337 A1 * | 3/2007 | Abe | A63F 13/52 463/30 |
| 2007/0104348 A1 * | 5/2007 | Cohen | A63F 13/10 382/100 |
| 2007/0111768 A1 * | 5/2007 | Tipping | A63F 13/10 463/6 |
| 2007/0156327 A1 * | 7/2007 | Tipping | A63F 13/10 463/7 |
| 2007/0197285 A1 * | 8/2007 | Kamijo | G06T 11/00 463/31 |
| 2008/0227548 A1 | 9/2008 | Choudhry et al. | |
| 2008/0291216 A1 | 11/2008 | Cheng et al. | |
| 2008/0291220 A1 | 11/2008 | Cheng et al. | |
| 2008/0293464 A1 | 11/2008 | Cheng et al. | |
| 2008/0293488 A1 | 11/2008 | Cheng et al. | |
| 2009/0061972 A1 * | 3/2009 | Tipping | A63F 13/803 463/6 |
| 2009/0149250 A1 * | 6/2009 | Middleton | A63F 13/12 463/31 |
| 2010/0173687 A1 * | 7/2010 | Tipping | A63F 13/5375 463/6 |
| 2010/0298050 A1 * | 11/2010 | Taraschuk | G09B 29/106 463/31 |
| 2011/0059783 A1 * | 3/2011 | Tipping | A63F 13/45 463/6 |
| 2011/0131172 A1 | 6/2011 | Herzog et al. | |
| 2011/0137629 A1 * | 6/2011 | Tipping | A63F 13/803 703/2 |
| 2012/0306923 A1 | 12/2012 | Boschker et al. | |
| 2017/0252651 A1 * | 9/2017 | Tipping | A63F 13/10 |

* cited by examiner

OUTPUT PRODUCTION

CROSS REFERENCE TO RELATED APPLICATIONS

This application claims the benefit of U.S. provisional application Ser. No. 61/409,027 filed on Nov. 1, 2010, which is hereby wholly incorporated by reference.

This application claims the benefit of, and is a continuation application of, U.S. application Ser. No. 13/194,946 filed on Jul. 30, 2011, which is hereby wholly incorporated by reference.

BACKGROUND

A user can play a video game on the video game console, where the console outputs content onto a display. For example, the video game can be a management game played on a personal computer. The management game can enable a player to take control of an entity, such as a railroad company. The player can lead the company through different scenarios, manage the company in an open world, compete against other players, etc.

BRIEF DESCRIPTION OF THE FIGURES

The accompanying drawings, which are incorporated in and constitute a part of the detailed description, illustrate various example systems, methods, and other example embodiments of various innovative aspects. These drawings include.

Figure 1:
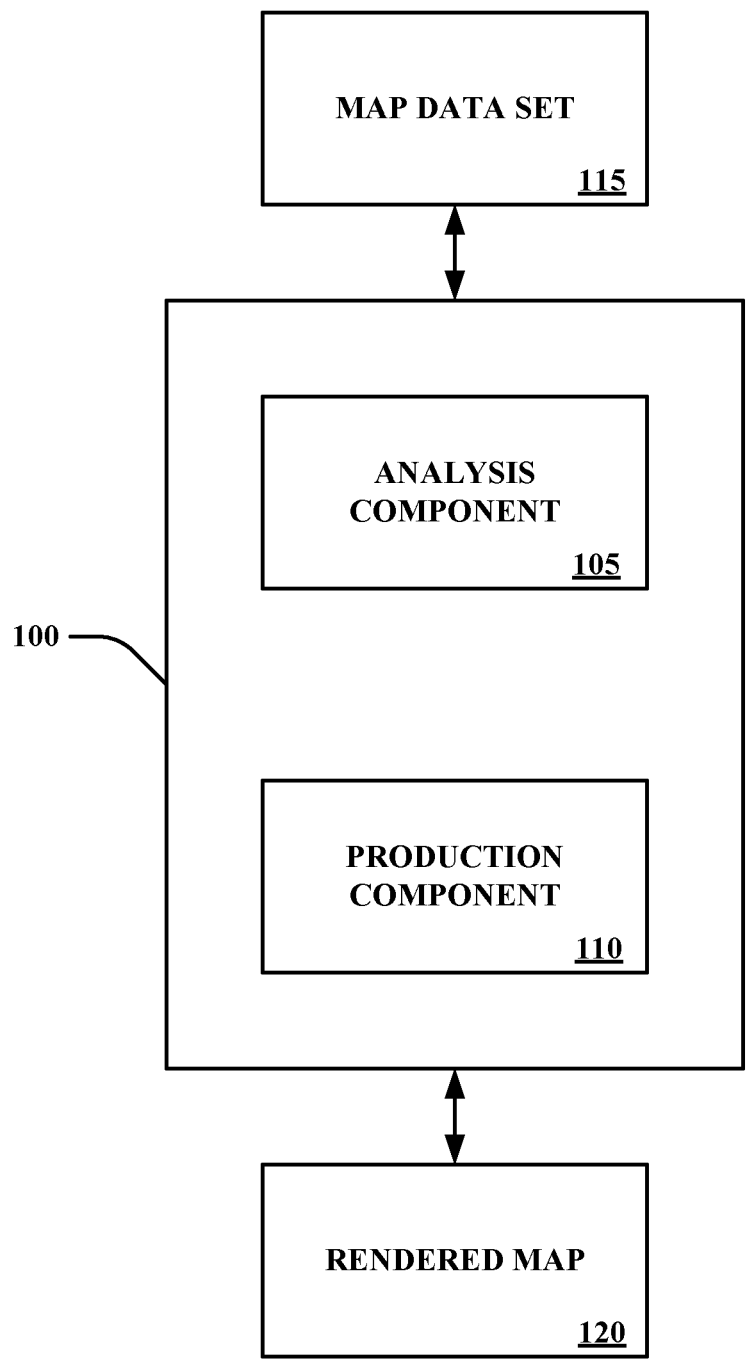
FIG. 1 illustrates one embodiment of a system that includes an analysis component and a production component.

It will be appreciated that illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. These elements and other variations are considered to be embraced by the general theme of the figures, and it is understood that the drawings are intended to convey the spirit of certain features related to this application, and are by no means regarded as exhaustive or fully inclusive in their representations. Additionally, it is to be appreciated that the designation 'FIG.' represents 'Figure'. In one example, 'FIG. 1' and 'FIG. 1' are referring to the same drawing.

The terms 'may' and 'can' are used to indicate a permitted feature, or alternative embodiments, depending on the context of the description of the feature or embodiments. In one example, a sentence states 'A can be AA' or 'A may be AA'. Thus, in the former case, in one embodiment A is AA, and in another embodiment A is not AA. In the latter case, A may be selected to be AA, or A may be selected not to be AA. However, this is an example of A, and A should not be construed as only being AA. In either case, however, the alternative or permitted embodiments in the written description are not to be construed as injecting ambiguity into the appended claims. Where claim 'x' recites A is AA, for instance, then A is not to be construed as being other than AA for purposes of claim x. This is construction is so despite any permitted or alternative features and embodiments described in the written description.

DETAILED DESCRIPTION

Described herein are example systems, methods, and other embodiments associated with output production, such as producing a map for a video game. One example type of video game is a racing video game. While examples to the racing video game are described herein to describe aspects, it is to be appreciated other type of video games can be employed according to those aspects, as well as other types of non-video game applications.

With this racing video game, a disk can be sold in a store that includes not only the application of the game (e.g., code used by a console to enable a user to play the game), but also game content. Example game content can include different cars and different tracks that the player can race the cars upon. Due to limited disk space, a limited number of tracks can be available on the disk. To obtain more tracks, players can spend additional funds for additional downloadable content that includes other tracks. However, even with available downloadable tracks and tracks sold with the disk, a relatively limited number of tracks can be made available to the user.

To alleviate this problem, a system can be used to create tracks for the user. These tracks can be created based upon a user request (e.g., automatically created). For example, a user can desire to race at a track not included in the game. The user can submit a request to his or her game console and in response to the request, information pertaining to the request can be gathered and a track can be generated (e.g., at the console, at a remote location, etc.). The user can use the track and the track can be made available to other players. As used herein, a remote location can refer to, but is not limited to, a first system. The first system and a second system can be two distinct systems that are not directly connected to one another and separated by physical distance that interact via at network or data link such as, for example, the Internet, a local area network, infrared ports, and soforth, in a wired or wireless fashion.

The following paragraphs include definitions of selected terms discussed at least in the detailed description. The definitions may include examples used to explain features of terms and are not intended to be limiting. In addition, where a singular term is disclosed, it is to be appreciated that plural terms are also covered by the definitions. Conversely, where a plural term is disclosed, it is to be appreciated that a singular term is also covered by the definition. In addition, a set can include one or more member(s).

References to "one embodiment", "an embodiment", "one example", "an example", and so on, indicate that the embodiment(s) or example(s) so described may include a particular feature. The embodiment(s) or example(s) are shown to highlight one feature and no inference should be drawn that every embodiment necessarily includes that feature. Multiple usages of the phrase "in one embodiment" and others do not necessarily refer to the same embodiment; however this term may refer to the same embodiment. It is to be appreciated that multiple examples and/or embodiments may be combined together to form another embodiment.

"Computer-readable medium", as used herein, refers to a medium that stores signals, instructions, and/or data. A computer may access a computer-readable medium and read information stored on the computer-readable medium. In one embodiment, the computer-readable medium stores instruction and the computer can perform those instructions as a method. The computer-readable medium may take forms, including, but not limited to, non-volatile media (e.g., optical disks, magnetic disks, and so on), and volatile media (e.g., semiconductor memories, dynamic memory, and so on). Example forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Component", "logic", "module", "interface" and the like as used herein, includes but is not limited to hardware, firmware, software stored or in execution on a machine, a routine, a data structure, and/or at least one combination of these (e.g., hardware and software stored). Component, logic, module, and interface may be used interchangeably. A component may be used to perform a function(s) or an action(s), and/or to cause a function or action from another component, method, and/or system. A component may include a software controlled microprocessor, a discrete logic (e.g., ASIC), an analog circuit, a digital circuit, a programmed logic device, a memory device containing instructions, a process running on a processor, a processor, an object, an executable, a thread of execution, a program, a computer and so on. A component may include one or more gates, combinations of gates, or other circuit components. Where multiple components are described, it may be possible to incorporate the multiple components into one physical component. Similarly, where a single component is described, it may be possible to distribute that single component between multiple physical components. In one embodiment, the multiple physical components are distributed among a network. By way of illustration, both/either a controller and/or an application running on a controller can be one or more components.

FIG. 1 illustrates one embodiment of a system 100 that includes an analysis component 105 and a production component 110. The analysis component 105 can be configured to analyze a map data set 115 to produce an evaluation result. The production component 110 can be configured to produce a rendered map 120 based, at least in part, on the evaluation result, where the rendered map is stored in a computer-readable medium (e.g., made available for use from the computer readable medium).

In one embodiment, the production component 110 can produce the rendered map 120 configured for use in a video game. In one embodiment, the rendered map 120 is a file that can be used by a video game console or other electronic device to produce a playable map in a video game. In an embodiment, the playable map was not included in the game's original content or developed for mass-use by a particular entity, but generated on-demand based on an individual end user's desire to participate in a previously un-modeled environment in the game setting. In one embodiment, the rendered map 120 is content produced on a display screen.

In one embodiment, a player can play a racing video game that enables the player to drive a video game race car (e.g., 2008 Ford Mustang GT) upon a video game race track (e.g., Indianapolis Motor Speedway). This video game race track may be based off a real race track and included on a disk of the video game. Tracks included on the disk can be considered a video game track set. The player may want to race in the video game on a specific track not included in the video game track set. Therefore, the system 100 may operate to create the specific track, or a plurality of tracks that are not pre-established within the shipped package.

Under the disclosures set forth herein, one or more systems or processes can have instances where workers (e.g., truck drivers, law enforcement, military personnel) can train on an area they are going into. In one example, the President of the United States can visit Elkhart, Ind. As part of Secret Service training, the rendered map 120 can be created proactively of a current state of Elkhart roads and agents can train on the map. This can allow realistic training that can be enabled at minimal expense and in an ongoing, timely fashion. Being able to render navigable or interactive maps using available data can have multiple applications.

Aspects disclosed herein can apply to various applications, subject matters, etc. Example areas where aspects disclosed herein can be practiced include video games (e.g., first person, third person, user interfaces or controls as replicated in games, etc.), simulators (e.g., ground vehicle, flight, ship, etc.), training systems, operation rehearsals (e.g., dismounted military mission, convoy preparation, commercial logistics, etc.), leisure, planning, navigation, virtual sightseeing or visitation, modeling and other predictive, optimization or analytical utilities dependent upon accurate reflections of space and time, etc. It is to be appreciated that these example areas are not an exhaustive list.

Figure 2:
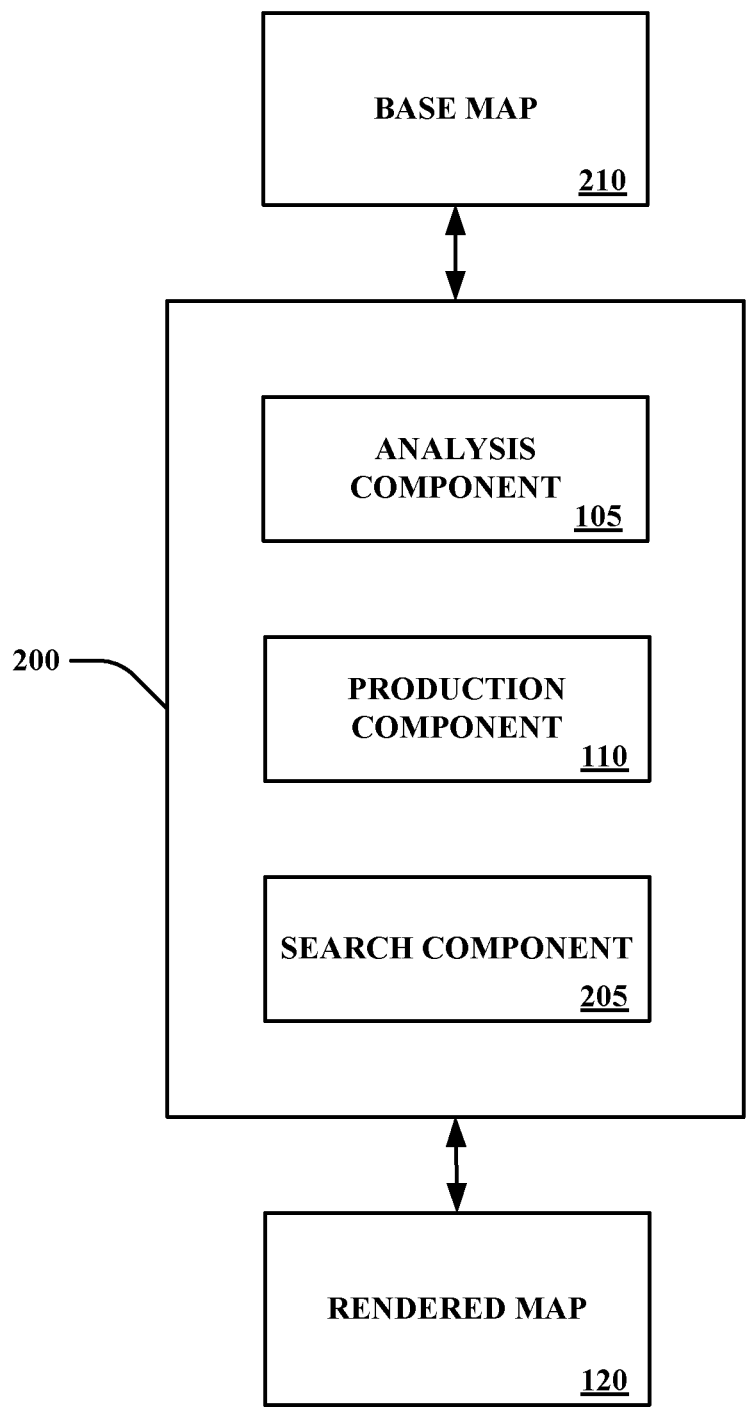
FIG. 2 illustrates one embodiment of a system that includes a search component along with the analysis component and the production component.

FIG. 2 illustrates one embodiment of a system 200 that includes a search component 205 along with the analysis component 105 and the production component 110. The search component 205 can be configured to determine if a base map 210 for the rendered map 120 is available. The base map can be considered is at least part of the map data set (e.g., the analysis component 105 analyzes the base map to determine if the base map meets a criteria set (e.g., one or more criterion) and the production component 110 designates the base map as the rendered map, with this designation being an output). The search component 205 can operate at varying granular levels, determining if portions of the base map 210 are sufficiently current or if one or more possible base maps can be extracted or combined to provide a more (e.g., the most) desirable search results.

Figure 3:
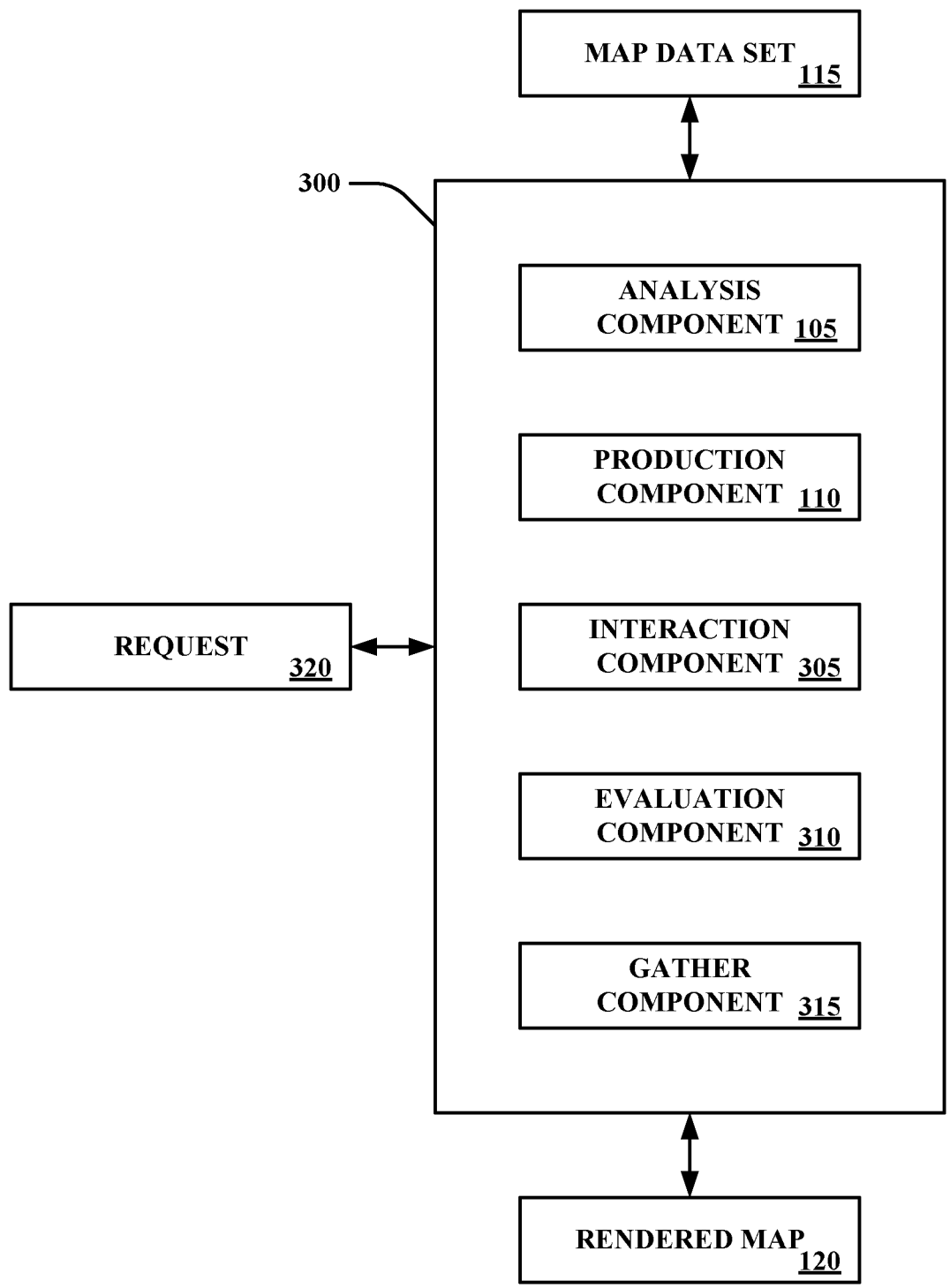
FIG. 3 illustrates one embodiment of a system that includes an interaction component, evaluation component, and gather component, along with the analysis component and production component.

FIG. 3 illustrates one embodiment a system 300 that includes an interaction component 305, evaluation component 310, and gather component 315, along with the analysis component 105 and production component 110. The interaction component 305 can be configured to receive a request 320 for the rendered map 120. The evaluation component 310 can be configured to evaluate the request 320 that produces an evaluation result, where the evaluation result indicates information to gather to produce the rendered map 120 (e.g., what data should be gathered as part of the map data set 115). The gather component 315 can be configured to gather the map data set 115 according to the information the evaluation result indicates to gather, where the map data set 115 is gathered prior to analysis by the analysis component 105.

In one example, the player can make the request 320 (e.g., through a user interface) to race at Circuit de Monaco, home of the Monaco Grand Prix, in his video game. The interaction component 305 receives the request 320 and the evaluation component 310 evaluates the request. As part of this evaluation, the evaluation component 310 can determine what information should be gathered to meet the user's request. The gather component 315 can 100 to locate information available on the Circuit de Monaco and collect such information. In one example, racing websites, a web mapping service application, and other locations (e.g., online locations) can be searched to gather information (e.g., map data of the map data set 115) about the Circuit de Monaco. Based on information gathered, the production component 110 can generate a video game version of the Circuit de Monaco and output the video game version (e.g., as the rendered map 210).

In one example, the player can make a request 320 (e.g., entered with a video game console controller) and this requested is received by the interaction component 305. The request can be to race at Burke Lakefront Airport, home of the Cleveland Grand Prix from 1982-2007. The gather component 315 can be employed to locate information available on Burke Lakefront Airport. In one example, racing websites, a web mapping service application, and other locations (e.g., online locations) can be searched to gather information (e.g., map data of the map data set 115) about the Burke Lakefront Airport. However, since a historical track is requested, other information may be used to determine how to render a video game version of Burke Lakefront Airport (e.g., historical weather information, different surface information based on repairs, etc.). In addition, different track layouts may be used during different years for the Cleveland Grand Prix (e.g., 1989 Cleveland Grand Prix had a different track layout than 1990 Cleveland Grand Prix). To determine which layout to create, the interaction component 305 can ask the player for more information (e.g., ask player which track should be rendered) or query one or more sources of information (e.g., compare with previous television watching to see if the player watched a particular race and making an inference that the track the player wants is the track he watched). In one embodiment, the production component 310 produces different layouts (e.g., the 1989 layout and 1990 layout) in response to the request 320 (e.g., when a specific layout for the request cannot be ascertained) and makes these layouts available to the player. The sources of information that make up the map data set 115 can be public or private, or a variant in between—for example, specific data or pointers/links to data can be stored in/on the video game, private or proprietary databases can be interrogated, public information can be investigated locally (e.g., local hard drive) or via a network (e.g., Wikipedia), and others. Based on information gathered, the production component 110 can generate a video game version of the Circuit de Monaco and output the video game version (e.g., as the rendered map 120).

While visual rendering can be performed, other rendering may be performed. In one example, in auto racing, track temperature can be important in determining how a car handles and other factors. A track can be rendered with temperature information (e.g., in addition to visual rendering). With rendering with temperature information, the track can represent properties relevant to the temperature (e.g., a colder track can cause a car to respond differently than a warmer track). In one example, real-time or recently taken temperature information can be used in rendering (e.g., from a taken track temperature reading, an inference drawn from air temperature over a period (e.g., the air temperature can indicate track temperature based on track surface type), and others). In one example, average temperature can be used to determine track temperature.

In one example, asphalt in Cleveland may behave differently than asphalt in Miami. Rendered asphalt (e.g., in a video game) can be based on asphalt in those locations. In one example, track can be based on real-time weather information (e.g., rain, temperature, sun exposure, and others). Different characteristics can be given to different parts of one track (e.g., start of course has different track temperature than end of course).

In an embodiment, a track can provide canned characteristic. In one example, a rendered track can show a temperature of 'x' degrees. This information can be given to a game and the game can have a car respond in a certain manner based on the temperature.

In one embodiment, a player can request a rendered map of Indianapolis Motor Speedway. A track at Indianapolis Motor Speedway can be arranged in different configurations. For example, an Indianapolis 500 configuration can configure as a squared oval while an Indianapolis Grand Prix (motorcycle race) configuration can configure as a road course. In one embodiment, the production component 110 can produce a rendered map of the Indianapolis Motor Speedway such that a user can select a configuration, a configuration can be proactively brought out by a video game (e.g., default squared oval, but player can select road course), and others. For example, the rendered map 120 can be produced while including track configurations for modern Indianapolis 500, a classic Indianapolis 500 (e.g., brick-covered track, partially brick-covered track, pre-brick crushed stone and tar track, etc.), a Formula One Grand Prix (a defunct race), or the Indianapolis Grand Prix motorcycle race. In one embodiment, a configuration is selected and high detail levels are given to track aspects that relate to the configuration while low detail levels are given to track aspects that do not relate to the configuration (e.g., if oval is selected, road course specific aspects can be given visual distance aspects but not be rendered with surface attributes such as track temperature).

In one embodiment, the player can request to play at Indianapolis Motor Speedway with an Indianapolis 500 configuration. The production component 110 can render the speedway with Indianapolis 500 configuration portions in high detail and other configurations in relatively low detail. Thus, if the player desires to play another configuration of the Indianapolis Motor Speedway, the low detail portions can be transformed into high detail.

In one embodiment, as a track is played in a video game, the track can have characteristics changed that change how the game plays. In one example, tracks can experience weeping (e.g., where water was seeping up through the asphalt and creating dangerous wet spots), tire marks from other video game cars breaking heavily on a track, and others. The track can reflect these changes to influence how a game plays (e.g., later in a game, more rubber on a track can lead to a different gaming result).

Figure 4:
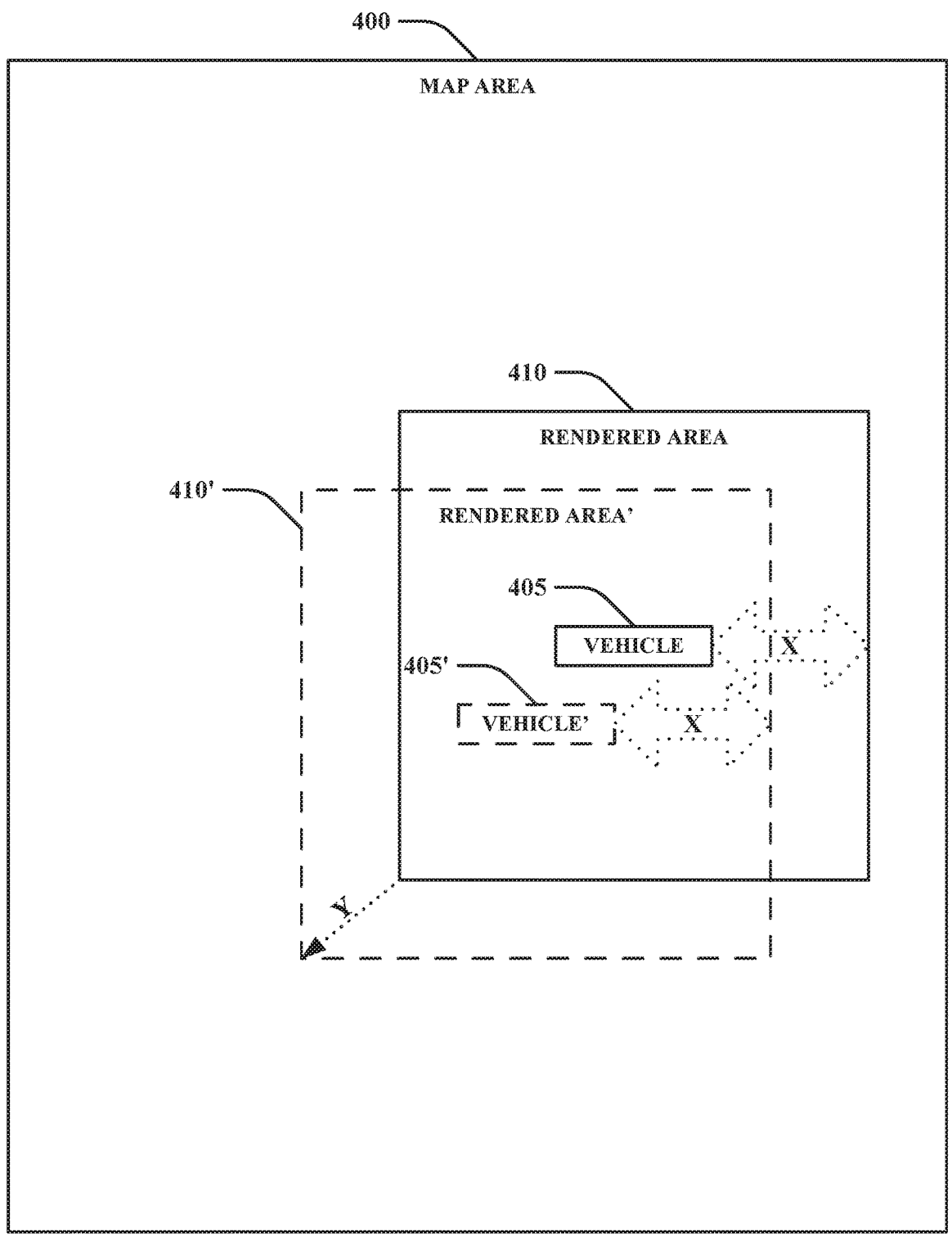
FIG. 4 illustrates one embodiment of a map area.

FIG. 4 illustrates one embodiment of a map area 400. The map area 400 can be at least a part of the rendered map 120 of FIG. 1. In one example, a video game can employ an open world concept. In the open world concept, a player can have a relatively large area to drive a car. In one example, the player can drive various streets of Cleveland, Ohio (e.g., a limited number of streets, streets with postal addresses, drivable areas (e.g., lawns, city parks, and others), and others). This differs from a track concept, where a player can be limited to drive on a track (e.g., Daytona International Speedway). The rendered map 120 can represent an open world concept map, a track concept, etc.

In the open world concept, a vast amount of information can exist, a vast amount of possible roads along with scenery can be available, and others. This can contrast the track concept where drivable roads are fixed, scenery for those roads is smaller than open world scenery, and others. In addition to preexisting data, other data can be mined or generated to expand the boundaries of the world to permit a user to travel such that there are no limitations or boundaries are apparent or encountered (e.g., in a sailing game, an ocean map can be generated allowing a player to circumnavigate the earth).

Due to the vast amount of information available in the open world concept, it may be undesirable to continuously use resources (e.g., processor, memory, and others) to render an entire, or particular thresholds of, an available open world at one time. In one example, a game can be configured to have a person drive on roads available in the United States and Canada. A vast amount of resources could be consumed to render possible road combinations available for possible routes in the United States and Canada. Therefore, selective rendering can occur (e.g., a selection component that can be part of the system 100 of FIG. 1) can select what to render.

In one example, a rendered area around a vehicle 405 of a video game is selected (e.g., a distance of 'X' around the vehicle 405 on the vehicle's sides). The system 100 of FIG. 1 can render a rendered area 410 around the vehicle 405 (e.g., the rendered area is at least part of the rendered map 120 of FIG. 1). As the vehicle moves in the map area 400, the rendered area 410 can change. In one example, an area within which the world is actively rendered by or in system resources is distance 'X'. If the vehicle moves in 'Y' direction, then a new rendered area 410' can be made around a newly positioned vehicle 405'. New rendered area 410' can be rendered entirely, or can merely clear a portion of resources representing the eliminated difference of rendered area 410 and recycle or use new resources to render the added difference as a portion of new rendered area 410'. The map area 400 can be considered the rendered map 120, a rendered area 410 and/or 410' can be considered the rendered map 120, etc.

In one embodiment, the system 100 of FIG. 1 causes a part of rendered area 410 that is not part of rendered area 410' to be deleted while rendering a part of rendered area 410' that is not part of rendered area 410. In one embodiment, the system 100 of FIG. 1 causes a part of rendered area 410 that is not part of rendered area 410' to be retained in a database while rendering a part of rendered area 410' that is not part of rendered area 410 (e.g., thus saving areas once they have been driven in the game).

The size of the distance 'X' can be determined based, at least in part, on one or more factors. In one example, the distance 'X' is fixed (e.g., set by a game programmer). In one example, 'X' is based, at least in part, on how much detail exists in the map area 400 (e.g., more detail means a smaller rendered area 410). In one example, 'X' is based, at least in part, on how fast the vehicle 405 is travelling in the game (e.g., faster vehicles have a larger radius since faster vehicles travels more distance is less time). In one example, 'X' is based, at least in part, on intelligent analysis of player driving style, vehicle speed, information ascertained for other players of the game, other factors, or a combination thereof. In one example, 'X' is based, at least in part, on available system resources. System resources can be analyzed (e.g., by the analysis component 105 of FIG. 1 or other component) in terms of an absolute metric (e.g., total memory), a relative metric (e.g., percentage-wise commit charge), contextual factors (e.g., other programs using memory, priority level of other programs using memory, etc.), and others.

Figure 5:
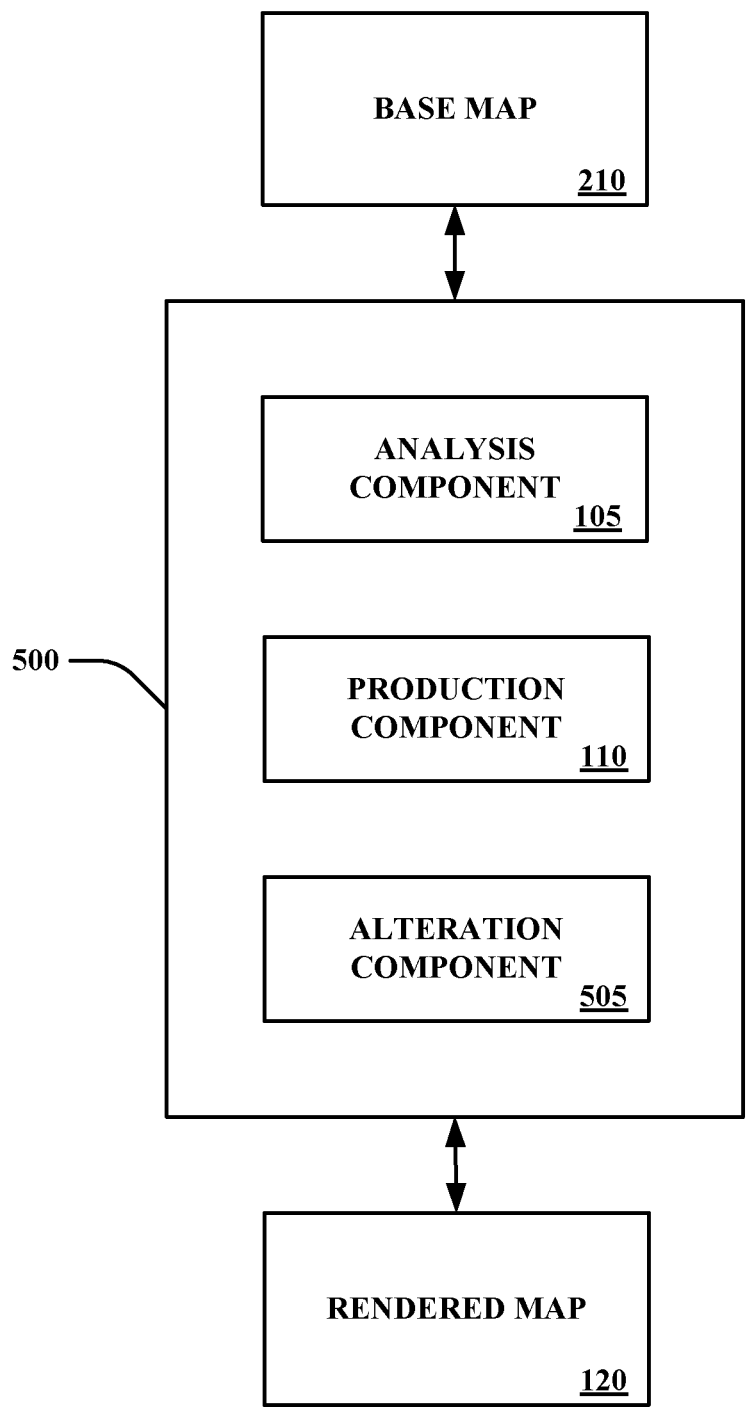
FIG. 5 illustrates one embodiment of a system that includes an alteration component along with the analysis component and the production component.

FIG. 5 illustrates one embodiment of a system 500 that includes an alteration component 505 along with the analysis component 105 and the production component 110. A video game player can be playing a first-person shooter video game and desire to have a multiplayer session on a small, uninhabited Pacific island. The search component 205 of FIG. 2 can perform a search for a map of the island and determine that a base map 210 for the island is available. The base map 210 can be a full rendering of the same island that was created for another game, a rendering of a part of the island, etc. The base map 210 can be considered the map data set 115 of FIG. 1.

The analysis component 105 (or other component) can evaluate the base map 210 to determine if the base map 210 should be altered (e.g., is alteration necessary for usage, balance accuracy against resource usage, etc.), how the base map 210 should be altered (e.g., how the map should be altered can be information of the map data set 115 of FIG. 1), etc. Based on a result of this evaluation, the alteration component 505 can alter the base map 210. In one embodiment, the alteration component 505 is part of the production component 110 such that alteration of the base map is production of the rendered map 120. Thus, in one embodiment, the base map is modified to become the rendered map (e.g., by the production component 110).

In one embodiment, a player can play a video game with the base map 210. New information can be discovered that pertains to the base map. For example, a golfing video game can include a specific golf course. When the base map 210 is created, an information source may state that the grass of greens on the course is Bent Grass. Thus, in the base map 210 has the player play on Bent Grass greens. However, a new information source can be discovered (e.g., newly available, newly found, a correction to the information source) that indicates the grass of greens is actually Bermuda Grass. The alteration component 505 can modify the base map 210 such that the golf course instead has Bermuda Grass greens. This alteration can change how the greens look, how the greens respond (e.g., how the greens play), etc. This alteration can occur while the base map 210 is being used, not being used, etc. Thus, the rendered map 120 can be produced (e.g., by the production component 110) such that a pre-rendered map (e.g., base map 210) is altered in accordance with the map data set 115 of FIG. 1 (e.g., information that the greens are Bermuda Grass) to become the rendered map 120.

A map can be rendered. After the map is rendered, new information can become available (e.g., be made known, be discovered by the system 600, be read, information to make a second data portion more reliable than a first data portion used to create the map, and others). In one example, the new information can be correction information 605 that corrects an error of the map.

In one embodiment, the system 500 is remote from the video game console, be located upon the video game console, operate in a non-video game environment, etc. Correction information (e.g., such as the change in the golfing grass) can be identified (e.g., by the search component 205 of FIG. 2). The analysis component 105 can evaluate the correction information and the base map 210 to produce an evaluation result. The alteration component 505 can determine how to modify the base map 210 based on the evaluation result, modify the map, transfer an instruction on how to modify the map, and others. The system 500 (e.g., by way of the alteration component 505) can emit a modification output. The modification output can be an instruction set on how to modify a map, a software kernel that proactively modifies a map, and others.

Additionally, the modification output can be transferred to multiple maps. In one embodiment, multiple iterations of the map can exist on game consoles. In one example, different consoles can have a rendered map of a particular city. A determination can be made (e.g., by the system 500) that a street becomes one-way during rush hour. Rendered maps of the particular city can be updated based on the determination. The modification output can be transferred to game consoles and the iterations of the map can exist. In this and other ways, maps can be dynamic based on context and update depending on real or imagined situations, or based on user or other preference (e.g., time of day, map settings, and others).

In one example, one correction can apply to different specific maps. In one example, a first map is of a city and a second map is of a county that includes the city. Both the city map and the county map can include a street with an error (e.g., a light post is in the rendered map that is not existent in real-life). The modification output can be applied to the city map and the county map such that the error is corrected. In one embodiment, different modification outputs can be made (e.g., one for the county map and one for the city map) and/or after the modification output is produced by the system 500 (e.g., by the alteration component 505), it can be copied and/or modified for different maps. In one embodiment, the system 500 makes different modification outputs for different maps.

In one embodiment, a map can be made up of and/or dependent upon another map. In one example, a county can be made up of a group of cities. Therefore, a county map can comprise city maps (e.g., maps of cities in the county). Thus, there may not actually be a county map in of itself, just a group of city maps that form a county. In one example, the modification output can be used to correct a city map that in turn corrects a county map.

The correction information can be different types of information. In one example, an error can be identified in base map 210 and the correction information can be information on how to correct the base map 210 (e.g., where correcting the base map 210 converts the base map 210 into the rendered map 120). In one example, a real-world area can be updated. In one example, a stop sign can be replaced with another traffic management notification device (e.g., yield sign, traffic light, and others). The correction information can be information to update base map 210 (e.g., a previously rendered map) to reflect the real-world area.

In one embodiment, a user can make modification to a track. In one example, the Indianapolis Motor Speedway can configure with a first and a second straightaway that are about fifty feet wide. A player can desire that the width be shortened and the alteration component 505 can modify the rendered track and/or the track can be rendered with the first and the second straightaway being narrowed. In one example, if a player desires to widen the track, the rendered map can be modified to not only widen the track, but modify other aspects (e.g., moving a grandstand, move a barrier wall, eliminate a grandstand, and others) to accommodate the widening.

In one embodiment, a multiplayer game or application map can be created and this creation can be based, at least in part, on map information. The multiplayer game or application can be local or over a connection. A group of people can play an online fantasy game (e.g., World of Warcraft) or similar virtual-world application (e.g., Second Life) as well as other games. A new area of the game can be based off a real area. In one example, Central Park in New York City or Nottingham Forrest in England can be analyzed (e.g., by the analysis component 105) and a map can be rendered with features of these areas playable in the online fantasy game. In another example, real-life places can be imported (e.g., function as the base map 210) and modified (e.g., by the alteration component 505) to serve as a basis or inspiration for a representation of an alternate reality (e.g., the rendered map 120). Components can be employed to analyze and render various aspects of a real-life map or environment according to a scheme set forth in the game or application.

Figure 6:
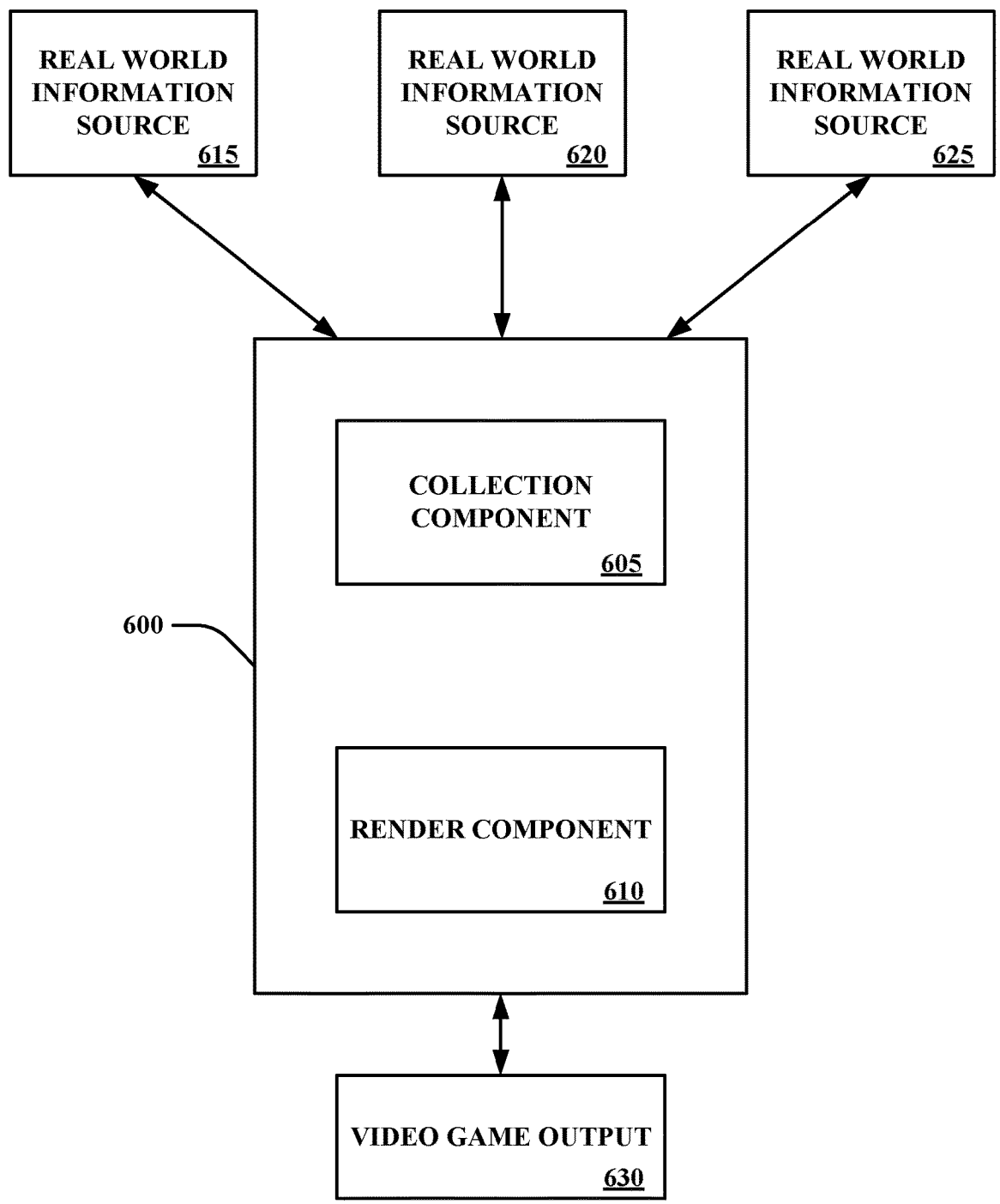
FIG. 6 illustrates one embodiment of a system that includes a collection component and a render component.

FIG. 6 illustrates one embodiment of a system 600 that includes a collection component 605 and a render component 610. The collection component 610 is configured to collect a physical information set. The physical information set can be collected from one or more physical information sources (e.g., physical information sources 615, 620, and 625) and/or from a remote location (e.g., a remote or local collection device that sends a packaged physical information set to the collection component 605 that the collection component 605 receives). The collection component 610 can also collect information that is not part of the physical information set (e.g., game console requirements). The render component 610 can be configured to produce a video game output 630 based, at least in part, on the physical information set, where the video game output 630 is stored on a computer-readable medium. In one embodiment, the collection component 605 and render component 610 reside upon a video game console (e.g., at least part of the collection component 605 and at least part of the render component 610).

Example physical information sources include Internet websites, databases, etc. Example physical information that can be part of the physical information set can include weather information, route information, opinion information (e.g., a group of users say a road is difficult to drive), visual information, audio information, depth information, etc. Physical information can be gleaned from a variety of sources, including a network or data link to the Internet, local networks, direct-connected systems, and communication devices capable of providing physical information from sources such as satellites, weather systems and stations, radio or telephonic communication, proprietary databases, geological or other surveys, map datum or data, and others. A baseline for such data can be ascertained in order to produce an average result where differing or conflicting physical information exists, and to fill gaps where physical information is incomplete or imperfect. It is to be appreciated that this is by no means a limiting list of physical information and one of ordinary skill in the art can appreciate that other information is to be included.

In one embodiment, the physical information set is a physical map information set and where the video game output 630 is a video game map. In one embodiment, the video game map comprises a race course and where the video game map enables use of the race course in a racing video game application. In one embodiment, the video game map comprises an environment upon which an avatar (e.g., human-type character) can navigate In one embodiment, the physical information set is voice information and where the video game output is video game audio commentary. For example, a college football broadcasting team (e.g., a play-by-play broadcaster and color commentator) can provide audio support for the broadcast of a college football game. The collection component 605 can obtain a copy of the audio support. The render component 610 can break down the audio support and extract singular lines (e.g., individual lines for the play-by-play broadcaster and color commentator related to play on the field). During game play of a college football video game on a video game console, the render component 610 can output (e.g., cause a video game console) of a singular line or multiple lines in response to an occurrence in gameplay, to set tone of gameplay, etc. For example, if a player in the game makes a hard hit, then a common term used by the color commentator can be played. As opposed to playing a version of the common term pre-recorded for the video game, a version is extracted from a real broadcast and played. In one embodiment, the render component 610 alters the common term to make it more suitable for gameplay (e.g., lowers volume, changes tone, replaces a player name, removes possibly offensive language, etc.).

While aspects disclosed herein discuss that the render component 610 produces a video game output 630, the render component 610 (and other components) can function to produce non-video game outputs. Thus, aspects disclosed herein can have applicability outside of the video game realm.

Figure 7:
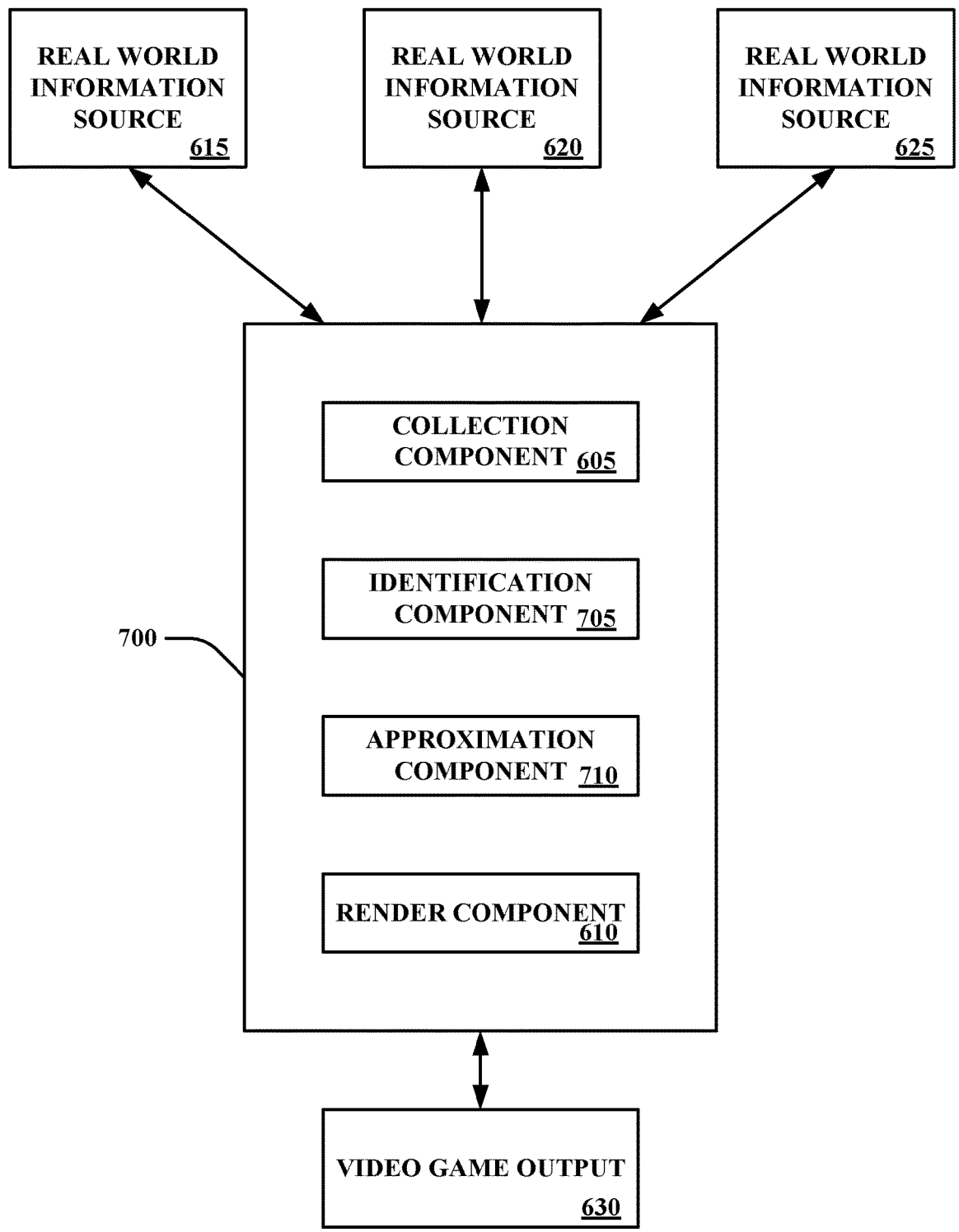
FIG. 7 illustrates one embodiment of a system that includes an identification component and an approximation component along with the collection component and the render component.

FIG. 7 illustrates one embodiment of a system 700 that includes an identification component 705 and an approximation component 710 along with the collection component 605 and the render component 610. The identification component 705 can be configured to identify missing information in the physical information set (e.g., obtained from the physical information sources 615, 620, and 625). The approximation component 710 can be configured to determine a substitute information set for the missing information, where the video game output 620 is based, at least in part, on the physical information set and the substitute information set.

The collection component 605 can receive a user request for a map to be made of a dirt road area for a rally car racing video game. The collection component 605 can obtain information pertaining to the dirt road area, including information related to how road are configured, weather conditions, and the like. However, some information about the road area may be unavailable. For example, what type of dirt the road is made up of, a mixture ratio of different dirt types for a road surface, and other information may be unavailable. The identification component 705 can identify the missing information (e.g., compare available information against information used to create previous map, compare available information against hardcoded information listed as desirable, etc.). The approximation component 710 can compensate for this missing information by generating substitute information. For example, an aerial photograph of the dirt road area can show the road being a certain color. The approximation component 710 can estimate a road dirt type based on this color. The render component 610 can produce the video game output 630 that is consistent with the estimated road dirt type. The video game output 630 can be a racing track where the track responds in a manner consistent with the estimated dirt type.

Figure 8:
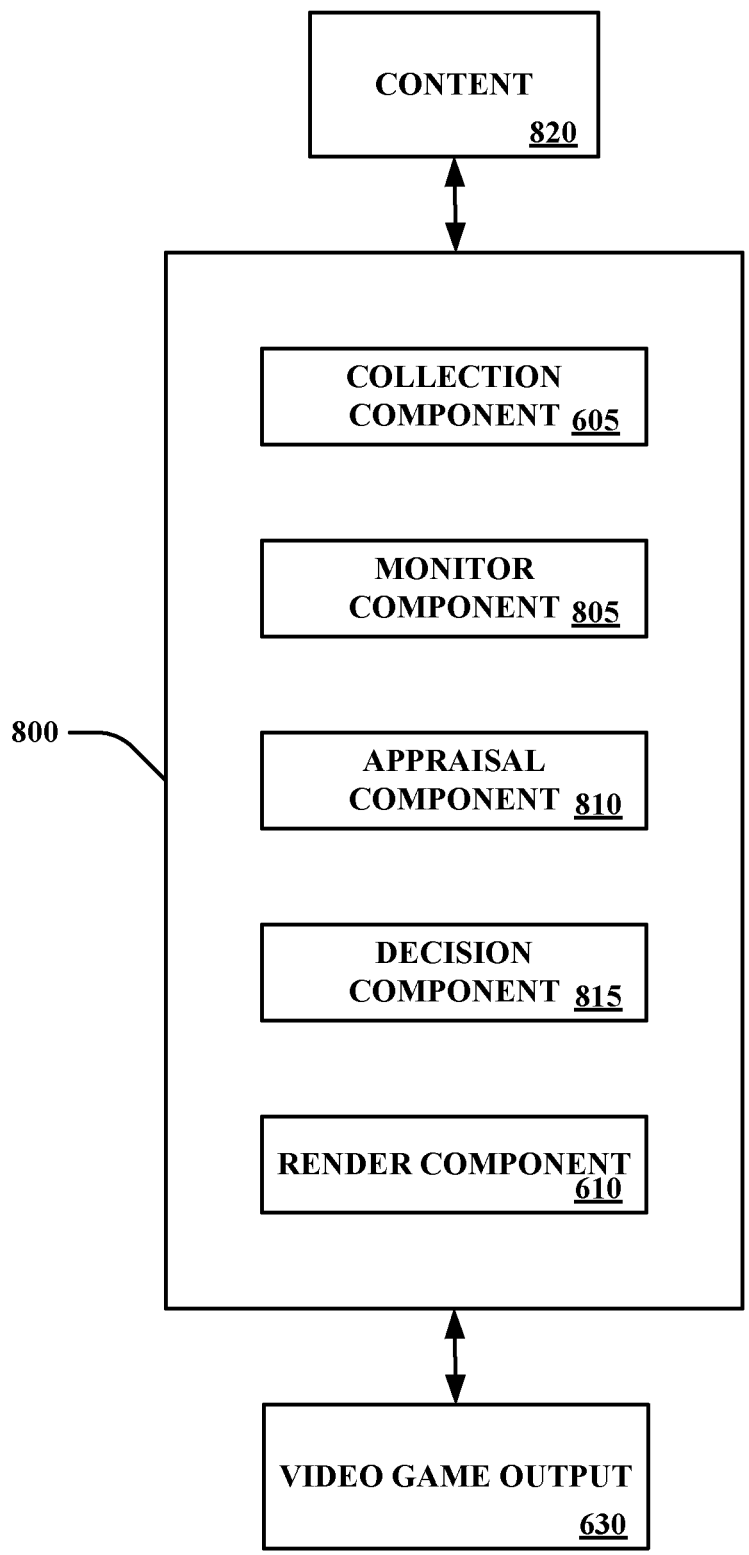
FIG. 8 illustrates one embodiment of a system that includes a monitor component, an appraisal component, and a decision component in addition to the collection component and the render component.

FIG. 8 illustrates one embodiment of a system 800 that includes a monitor component 805, an appraisal component 810, and a decision component 815 in addition to the collection component 605 and the render component 610. The monitor component 805 can be configured to monitor a content 820 presented by way of an electronic device (e.g., a video displayed on a television, a song played on a personal computer speaker system, a webpage visited on a smartphone, etc.). It is to be appreciated that the system 800 can function without the monitor component 805. The appraisal component 810 can be configured to evaluate the content 820. The decision component 815 can be configured to proactively (e.g., automatically) select the video game output 820 for production (e.g., send an instruction to the render component 810 on what video game output 820 the render component 610 should produce) based, at least in part, on a result from evaluating the content 820.

The system 800 can function to provide a user with content the user is likely to want. For example, a user can watch a car race on television on a particular track. The system 800 can make an inference (e.g., through use of at least one artificial intelligence technique) that the particular track should be created for the user after the monitor component 805 monitors the content 820. In one embodiment, before moving further the system 800 can confirm with a user that the track should be rendered as video game output 620 (e.g., through a user interface) and the decision component 815 instructs components to go forward based, at least in part, on the user confirmation. The appraisal component 810 can evaluate the content and based on this evaluation, the collection component 605 can seek out information about the particular track, such as recording the content 820 (e.g., on a computer readable medium), performing an Internet search for a website of the particular track and downloading results, and others. This information can be used by the render component 610 to produce the video game output 630.

In one embodiment, a user can be watching a classic baseball game at Tiger Stadium in Detroit, Mich. on a smartphone, where the classic baseball game is the content 820. The monitor component 805 can monitor the content 820 (e.g., extract information from the content 820, where the extracted information is a monitoring result). The appraisal component 810 can evaluate the content 820 (e.g., the content 820 itself, information extracted from the content 820, inferences drawn from monitoring the content 820, etc.) and based on this evaluation, the decision component 815 can decide if the video game output 630 should be produced based on the content 820, determine if enough information is available to produce the video game output 630 (e.g., if so, then instruct the render component 610 to operate; if not, then cause the collection component 605 to gather more information), etc.

Figure 9:
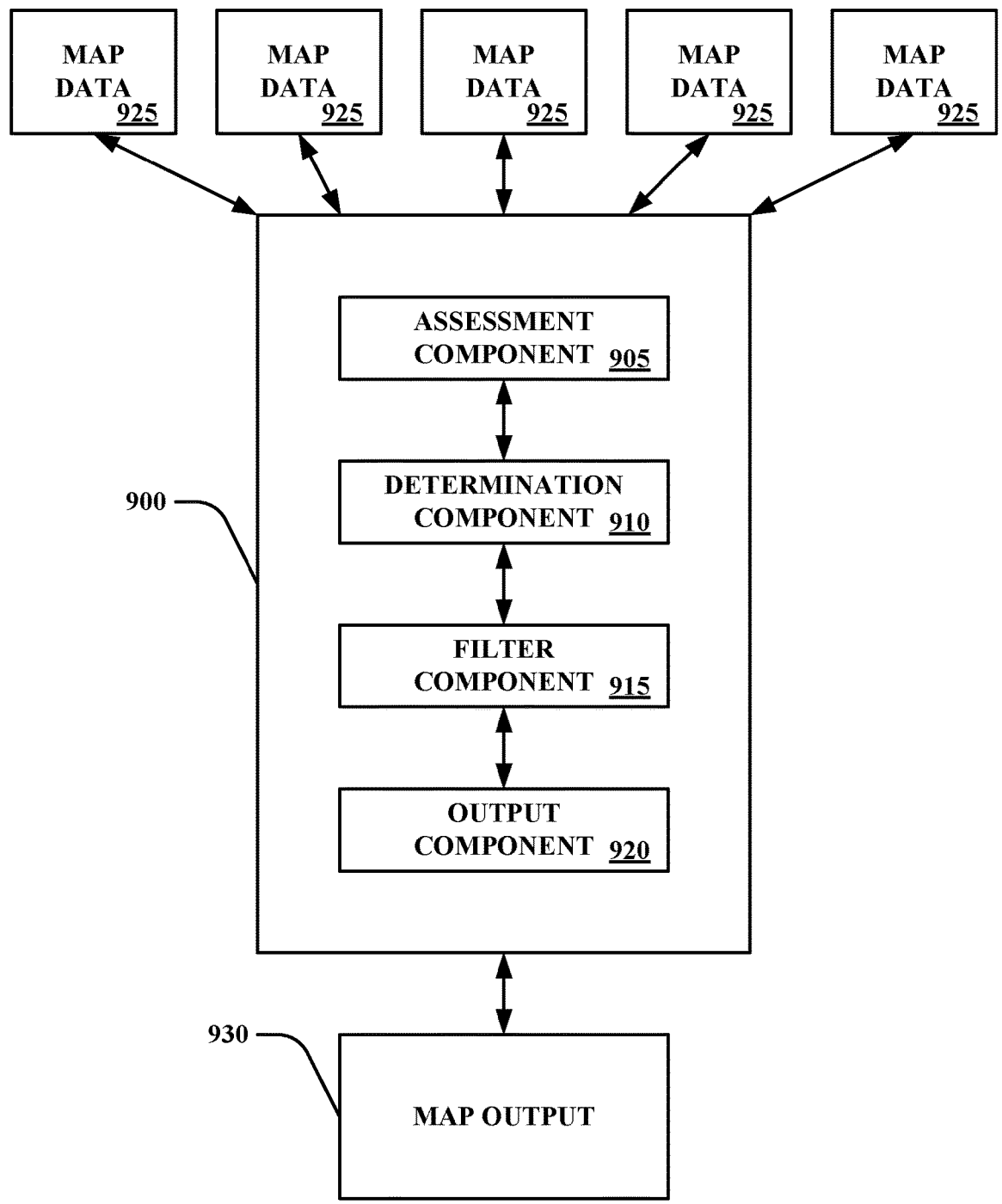
FIG. 9 illustrates one embodiment of a system that includes an assessment component, determination component, filter component, and output component.

FIG. 9 illustrates one embodiment of a system 900 that includes an assessment component 905, determination component 910, filter component 915, and output component 920. The system 900 can incorporate the analysis component 105 of FIG. 1, production component 110 of FIG. 1, the collection component 605 of FIG. 6, and/or the render component 610 of FIG. 6. Different pieces of map data 925 (e.g., that are part of the map data set 115 and/or obtained by the sources 615, 620, and/or 625) can be collected by the system 900. Example map data can include personal images, map application data, text (e.g., available online for a message board), microblogging (e.g., used to ascertain real-time traffic information), new information service broadcasts (e.g., traffic accident reports from new organizations), and others.

The assessment component 905 can evaluate the map data and the determination component 910 can determine which map data 925 to use in rendering and/or updating a map. In one example, different pieces of map data can contradict one another.

In one example, an information source states that traffic on Main Street is heavy while a news report states that traffic on Main Street is medium. In an embodiment, the information source can be a real-time feed or stream such as a microblog (e.g., Twitter) or feed from a social, news or government network (e.g., Facebook news feed, local media RSS (Really Simple Syndication) feed, state police network, etc.). The determination component 910 can determine if traffic on Main Street is heavy or medium (e.g., a determination is made that traffic is medium if intelligence of the determination component 910 weighs the news report as more accurate than the microblog (e.g., microblogs in general, a specific person who made the microblog, and others)).

In one example, two photographs (e.g., a first photograph and a second photograph) are collected by the system 900 and evaluated by the assessment component 905. In the first photograph a light pole is shown colored green. In the second photograph, the light pole is shown as colored blue. The determination component 910 can determine what color to make the light pole in an output (e.g., the rendered map 120 of FIG. 1). In one example, the determination component 910 can analyze when the photographs were taken and information in a more recent photograph is used (e.g., date stamp, Exchangeable Image File Format (EXIF) information, Extensible Metadata Platform (XMP) information, International Press Telecommunications Council (IPTC) metadata information, other metadata, an inference such as that the pole was painted and therefore the more recent photograph is more accurate, and others). In one example, the determination component 910 can actively seek out information to be used in determining a color for the light pole (e.g., find other photographs, acquire a real-time satellite image, and others).

The filter component 915 can limit map data 925 transferred to the output component 920 (e.g., the output component 920 functioning as the production component 110 of FIG. 6, the output component 920 functioning as the render component 610 of FIG. 6, etc.). In one embodiment, the determination component 910 instructs the filter component which pieces of map data 925 should be passed to the output component 920 (e.g., used to create a map). The output component 920 can render a map based on the map data 925 (e.g., map data 925 passed through the filter component 915). The output component 920 can produce a map output 930 (e.g., the rendered map 120 of FIG. 1, a data set upon which the production component 110 of FIG. 1 renders a map, an instruction on how to modify the rendered map 120 of FIG. 1, the video game output 630 of FIG. 6, etc.).

In one embodiment, information related to a person can be used proactively create data (e.g., a gaming map) for the person. In one example, a person could frequent message boards and write posts stating that they wished they could play a first person shooter on the moon, send messages to friends (e.g., e-mails) expressing this desire, and others. Based on the posts and messages, an inference could be drawn that the player wants to play a map of the moon in a game she commonly plays. The system 900 can proactively gather map data 925 that pertains to the moon and proactively generate the map output 930 of the moon for play in the game.

Similarly, a map can be modified based on information. In one example, a person can play a map on a first person shooter game. In this map, an unintentional game aspect can occur that a person considers a cheat. In this example, players may play on opposing teams and have a goal of capturing and retaining checkpoints to achieve a team score. However, a map can include a feature where players on one team can lob grenades across a game board in an unrealistic and/or unfair manner toward one of the checkpoints that kills members of the opposing team. A component can function to identify this supposed cheat, determine if a proactive modification of the map and/or the game should occur, and if a positive determination is made, then to modify the map and/or the game. Various outcomes can cause proactive modification and different modifications can occur. In one instance, the modification can be in response to observed player behavior (e.g., players skipping a map a disproportionate amount of times (e.g., when disproportionate skipping is identified, analyzing conduct to infer why skipping occurs)), response to complaints filed against a certain player who is performing the supposed cheat, response to conversations over a network hosting the game complaining of the supposed cheat, and others. The modification can include modifying the map to render the supposed cheat inoperable (e.g., placing a barrier (e.g., real or invisible) such that the cheat is disabled), modifying the game (e.g., causing the grenade to explode if sent from a certain angle, from a certain spot, from a certain spot with a certain angle, from a certain weapon, etc.), modifying the game and/or map locally, modifying the game and/or map universally, and others. Enabling proactive modification can enable a game to be improved after later versions are out, a game is no longer supported by a manufacturer, and others.

Figure 10:
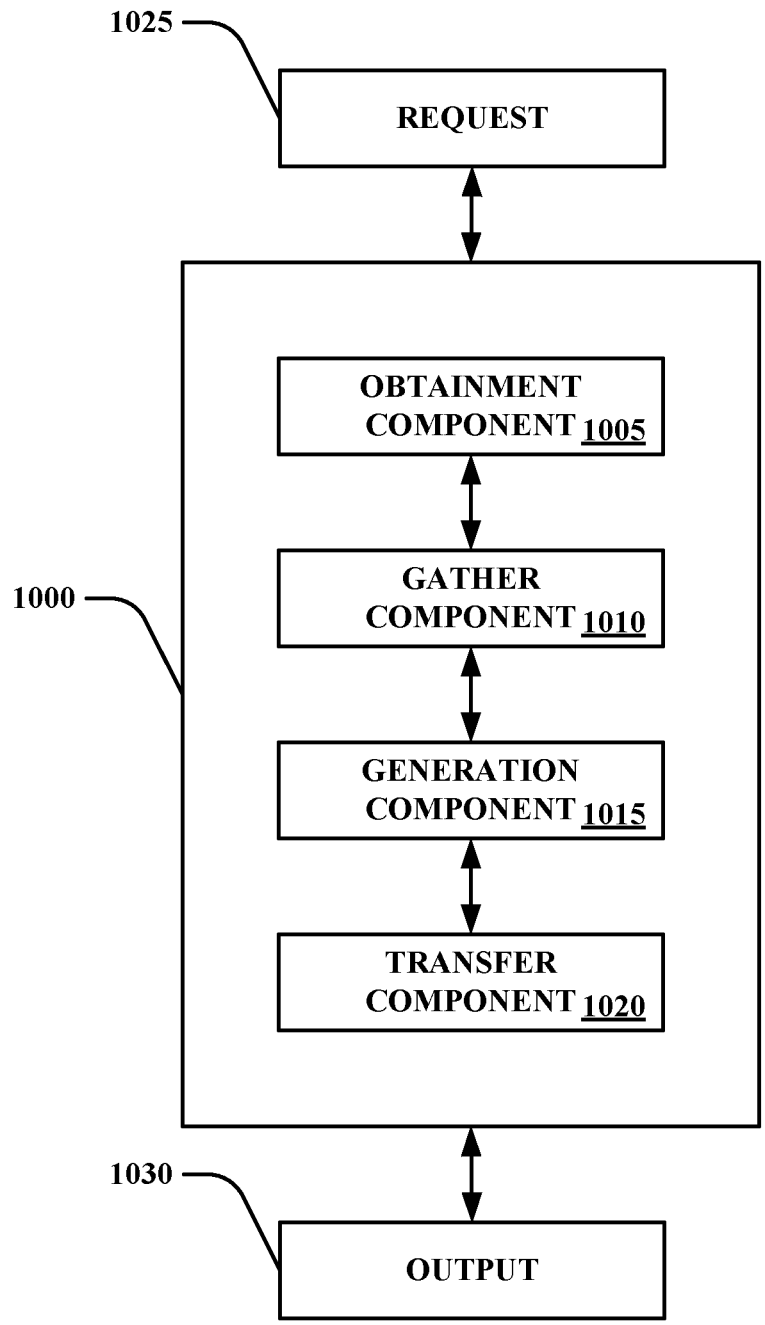
FIG. 10 illustrates one embodiment of a system that includes an obtainment component, a gather component, a generation component, and a transfer component.

FIG. 10 illustrates one embodiment of a system 1000 that includes an obtainment component 1005, a gather component 1010, a generation component 1015, and a transfer component 1020. The system 1000 can incorporate the analysis component 105 of FIG. 1, production component 110 of FIG. 1, the collection component 605 of FIG. 6, and/or the render component 610 of FIG. 6. A person can make a request 1025 for a map to be generated and the obtainment component 1005 (e.g., operating as the collection component 605 of FIG. 6) collects the request 1025. In one embodiment, the request 1025 is for a specific area to be created (e.g., a map of Bonneville Salt Flats). In one embodiment, the request 1025 is for a specific area with specific characteristics (e.g., a map of New Orleans on Fat Tuesday (e.g., with roads closed for parade routes), a map of New York City in heavy traffic, a map of Glasgow, Scotland in heavy rain, and others). In one embodiment, the request 1025 is a general request (e.g., a request for a random map to be created).

The gather component 1010 can be employed to gather information. In one embodiment, the gather component 1010, obtainment component 1005, and collection component 605 of FIG. 6 can implement as one component. In one embodiment, a requested map may already exist (e.g., on a database, on a game console, and others). If a requested map already exists, then the gather component 1010 can collect the requested map and the requested map can be outputted as output 1030 (e.g., by the transfer component 1020 and without passing the map through the transfer component).

In one embodiment, the gather component 1010 searches for a map meeting the request 1025 and identifies a map that meets the request 1025 at a location. The transfer component 1020 can cause the map that meets the request 1025 to transfer to a location designated in the request 1025 (e.g., transfer directly without residing on the system 1000).

In one embodiment, the gather component 1010 identifies information sources and collects information that can be used in generating a rendered map. Based on collected information, the generation component 1015 can construct a map for use on a computer (e.g., a video game, a training map, a movie (e.g., a map used in a cartoon), and others). The transfer component 1020 can transfer the map as output 1030 (e.g., the rendered map 120 of FIG. 1, the video game output 630 of FIG. 6, etc.).

In one embodiment, a base map (e.g., base map 210 of FIG. 5) for a requested map is available. The gather component 1010 can collect the base map. In one example, the person requests a map of Lucas County, Ohio. Maps may be available for Toledo, Ohio; Sylvania, Ohio; and Oregon, Ohio (e.g., these three cities for the base map). However, maps may not be available for Maumee, Ohio as well as for villages and townships of Lucas County, Ohio. Therefore, the gather component 1010 collects information on how to render Maumee, Ohio as well as for villages and townships of Lucas County, Ohio. The generation component 1015 renders a map and the transfer component 1020 outputs the map (e.g., as output 1030).

In one embodiment, the base map is a map of a city and the generation component 1015 modifies the map for specific characteristics. In one example, the city is Tyler, Tex. and a base map for Tyler, Tex. is available. However, the request 1025 can include a portion that specifies racing in a hot temperature. A hot temperature can change road conditions. The base map for Tyler, Tex. can be configured to function with average temperature properties. The generation component 1015 can modify the base map to change properties to those of hot temperature. In one embodiment, public or private weather services or other information sources can be consulted for these purposes (e.g., cause map to reflect weather that is actual/real-time, representative of historic trends, user-selected, etc.). In one embodiment, how roads in Tyler, Tex. react to hot temperatures can be reflected in the output 1030.

In one embodiment a player requests (e.g., through the request 1025) for an arena to be created (e.g., a modern-day Madison Square Garden, a 1920 Madison Square Garden set-up for a fight between Jack Dempsey and Bill Brennan, a Madison Square Garden with player requested modifications, and others) for play in a boxing game. The gather component 1010 can search the Internet for images and information on Madison Square Garden. In one example, if the request 1025 is for the 1920 Madison Square Garden set-up for the fight between Jack Dempsey and Bill Brennan, then the gather component 1010 can search the Internet to find archived photographs, newspaper descriptions, and others. Based on data collected by the gather component 1010, the generation component 1015 can create the arena and the transfer component 1020 can transmit the arena as output 1030 (e.g., transmit the arena to a game console).

Figure 11:
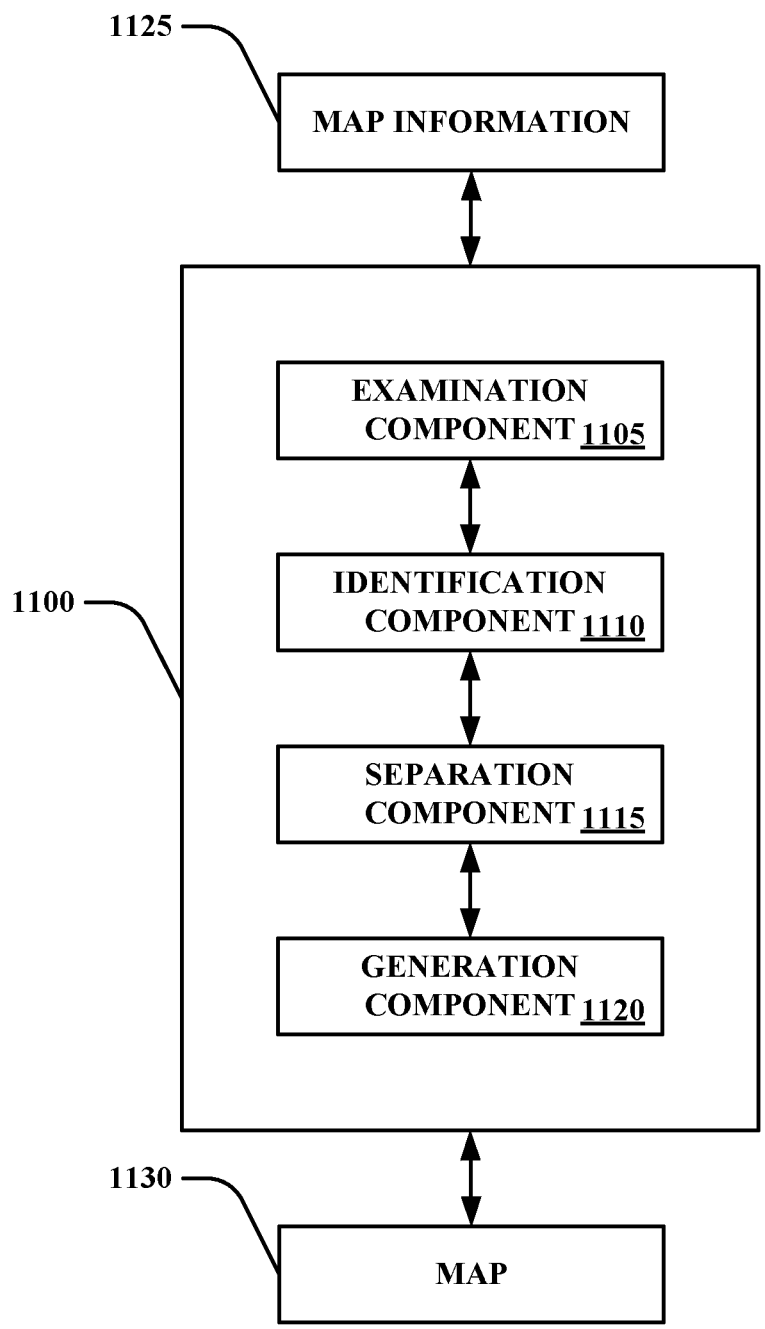
FIG. 11 illustrates one embodiment of a system that includes an examination component, an identification component, a separation component, and a generation component.

FIG. 11 illustrates one embodiment of a system 1100 that includes an examination component 1105, an identification component 1110, a separation component 1115, and a generation component 1120. The system 1100 can incorporate the analysis component 105 of FIG. 1, production component 110 of FIG. 1, the collection component 605 of FIG. 6, and/or the render component 610 of FIG. 6. Map information 1125 (e.g., the map information is the map data set 115 of FIG. 1 and/or is obtained from the sources 615, 620, and 625 of FIG. 6) can be collected (e.g., actively (e.g., the system 1100 seeks out map information) and/or passively (e.g., map information is sent to the system 1100 (e.g., directly (e.g., by another unit) or indirectly (e.g., radio waves) by the system 1100 and evaluated by an examination component 1105. The system 1100 can be configured to render a map 1130 based off a specific location. However, a desire may exist for a map to not be a correct representation of the specific location. In one example, a person can request to have a map made of Windsor, Ontario, Canada. However, some real-life roads may include adult establishments (e.g., casino, strip clubs, night clubs, and others). The desire may be to mask these adult establishments from a child, so if a person making a map request is a child, the system 1100 can filter out adult aspects when producing the map 1130 (e.g., the map 1130 can be the rendered map 120 of FIG. 1, the map 1130 can be video game output 630 of FIG. 6, etc.).

The examination component 1105 can examine the map information 1125 and produce an examination result. The identification component 1110 can use the evaluation result to identify items to not be rendered in the map 1110. In one example, parental controls can at least partially control intelligence used by the identification component 1110 to identify map information not to be used, replaced, and other in the map 1130. In one embodiment, the identification component 1110 can identify copyrighted information and cause the copyrighted information to be replaced in a rendered map. In one embodiment, the identification component 1110 functions by scanning photographs for copyrighted information, inappropriate content (e.g., sexually suggestive advertisements), etc.

In one embodiment, the system 1100 can function to replace advertisements with targeted advertisements. In one example, the identification component 1110 can identify unused advertisement locations in the map information 1125, identify advertisements that can be replaced, as well as select advertisements for use (e.g., based on aggression levels, personal history, contract fulfillment, and others).

The separation component 1115 can filter out map information not to be rendered, not to be considered in rendering, and others. The generation component 1120 can take information produced out of the separation component 1115 and render the map 1130 or cause the map 1130 to be rendered (e.g., at another location). In one embodiment, the generation component 1120 modifies the rendered map 120 of FIG. 1. In one embodiment, the production component 110 of FIG. 1 and/or the render component 610 of FIG. 6 function as the generation component 1120.

Figure 12:
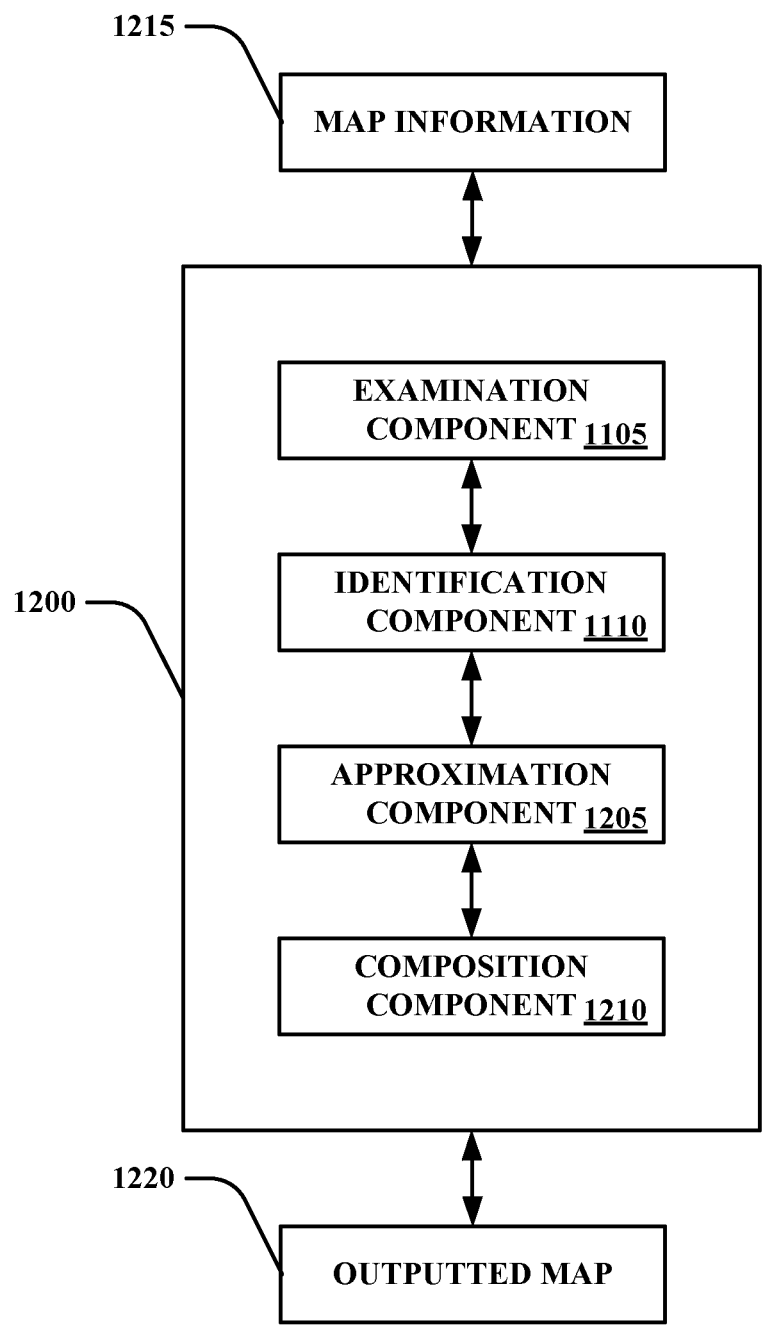
FIG. 12 illustrates one embodiment of a system that includes the examination component, the identification component, an approximation component, and a composition component.

FIG. 12 illustrates one embodiment of a system 1200 that includes the examination component 1105, the identification component 1110, an approximation component 1205, and a composition component 1210. The system 1200 can incorporate the analysis component 105 of FIG. 1, production component 110 of FIG. 1, the collection component 605 of FIG. 6, and/or the render component 610 of FIG. 6. The system 1200 can collect map information 1215 (e.g., the map data set 115 of FIG. 1) and the examination component 1105 can evaluate the map information 1215. The examination component 1105 can evaluate the map information 1215, at least in part, with regards to if there are any unknown areas.

In one embodiment, the map information 1215 may be deficient or otherwise less than ideal for a particular context or in a particular instance. In one example, the map information is to train submarine crews on navigating oceans. However, specific information at deep ocean depths may not be available. Therefore, the system 1200 can make approximations. The identification component 1110 can identify areas that are appropriate for approximation and the approximation component 1205 can make approximations of these areas.

In one example, a map is designated for creation of an area of ocean at a deep depth. Actual map information related to the area at the deep depth may not be available. However, the system 1200 may be able to obtain auxiliary information. Example auxiliary information can include: wildlife found in the region and are comfortable around the deep depth, scientific calculation information (e.g., pressure at the depth, natural light that would make it to the depth, and others), information derived from ocean models, and others.

The composition component 1210 (e.g., production component 110 of FIG. 1, render component 610 of FIG. 6, etc.) can create a map based on approximation information and map information 1215. The map can be outputted as an outputted map 1220 (e.g., rendered map 120, video game output 630, etc.). In one embodiment, the composition component 1210 can cause a component to create a map and/or output a map (e.g., send an instruction to the production component 110 of FIG. 1 to create the rendered map 120 of FIG. 1).

In one embodiment, the outputted map 1220 can be evaluated to determine if approximations are appropriate. If approximations are appropriate, then the outputted map 1220 can be transmitted (e.g., caused to be transmitted, caused to be rendered, caused to be created, and others). If an approximation is not appropriate, then the system 1200 can determine how to correct the approximation (e.g., through implementation of an artificial intelligence technique) and correct the approximation. Another check can occur, this can repeat if appropriate, and the outputted map 1220 can be outputted. In one embodiment, approximations can be noted (e.g., in a file associated with the outputted map 1220) and as new map information is gathered, the approximations can be replaced with real map information, approximations can be modified as new information is available, and others.

In one embodiment, the outputted map 1220, the video game output 630 of FIG. 6, the rendered map 120, and others can be checked for accuracy after production. In one example, the examination component 1105 can compare the rendered map 120 of FIG. 1 against the map data set 115 of FIG. 1 to determine if the rendered map 120 of FIG. 1 is an accurate representation of the map data set 115 and/or actual location. If the rendered map 120 of FIG. 1 is not an accurate representation, then the rendered map 120 of FIG. 1 can be corrected, a subsequent rendered map can be generated, an error message can be presented, etc. In one embodiment, to avoid correction, the rendered map 120 of FIG. 1 can have a similarity threshold to the map data set 115 of FIG. 1 (e.g., rendered map 120 of FIG. 1 is X % similar to the map data set 115 of FIG. 1).

In one example, a football video game can be released with an error (e.g., a rendered stadium can show a running track around a field when a real stadium upon which the rendered stadium is based has no track). A user can submit information that an error occurred, an inference can be drawn that users are using a map editor to correct the error, a comparison can be made with photographic evidence publically available (e.g., off an Internet map application), and others. A result can occur where new releases and/or existing releases can be updated correcting the error (e.g., updated automatically). In one example, a stadium can be rendered correctly (e.g., as the rendered map 120 of FIG. 1), but over a season or over time a change can occur. In one example, lighting poles can be painted from one color to another. When this information is learned, an update can occur (e.g., occur proactively).

Figure 13:
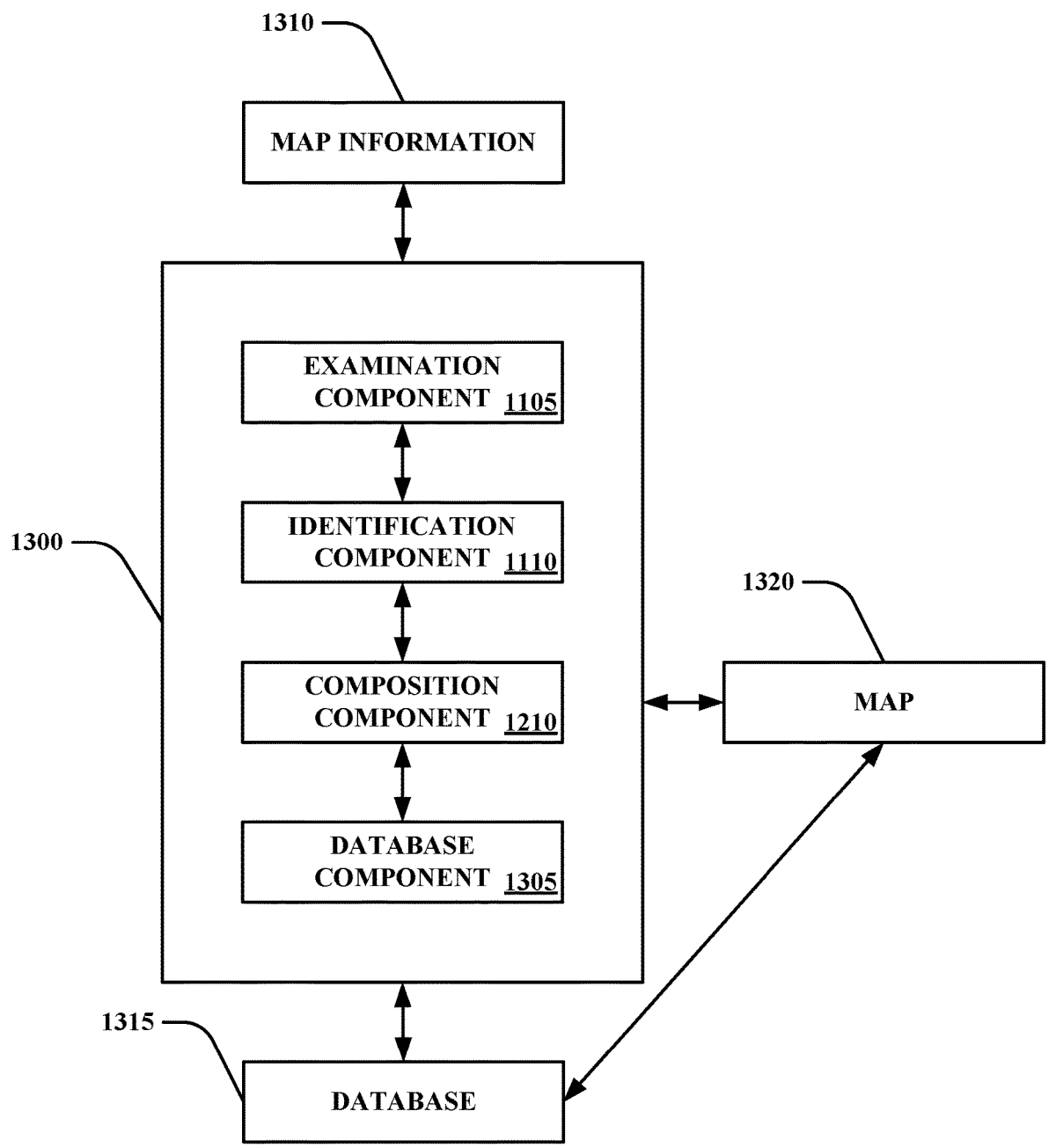
FIG. 13 illustrates one embodiment of a system that includes the examination component, the identification component, the composition component, and a database component.

FIG. 13 illustrates one embodiment of a system 1300 that includes the examination component 1105, the identification component 1110, the composition component 1210, and a database component 1305. The system 1300 can incorporate the analysis component 105 of FIG. 1, production component 110 of FIG. 1, the collection component 605 of FIG. 6, and/or the render component 610 of FIG. 6. Map information 1310 can be collected by the system 1300. The examination component 1105 can analyze the map information 1310 and based on this analysis, the identification component 1110 can identify map information 1310 that can be used to create a map 1320 (e.g., the rendered map 120 of FIG. 1 produced by the production component 110 of FIG. 1).

In one embodiment, the system 1300 is part of a network that shares a database 1315. The database 1315 can retain maps that can be made available to network members (e.g., on a wired network, on a wifi network, on a super wifi network, and others). The map 1320 (e.g., the outputted map 1220 of FIG. 12, the rendered map 120 of FIG. 1, etc.) can be retained on the database 1315 (e.g., in addition to transferring the map to a designated destination).

In one embodiment, the system 1300 can receive a request for a map 1320 (e.g., a map of Normandy, France on Jun. 6, 1944). A check can occur by the system 1300 (e.g., by the examination component 1105) to determine if the database 1315 includes the map 1320. If the database 1315 does include the map 1320, then the system 1300 is caused to output the map 1320 (e.g., cause the map 1320 to be sent directly from the database 1315). If the database 1315 does not include the map 1320, system 1300 can create the map 1320 (e.g., as the map of Normandy, France on Jun. 6, 1944).

In one embodiment, a check is performed to determine if the database 1315 does not include the map 1320. However, the database 1315 may include a modern-day map of Normandy, France. The system 1300 can gather the modern-day map of Normandy, France and collect historical information about Normandy, France on Jun. 6, 1944. The composition component 1210 can modify (e.g., modify a local copy) and/or base a new map off the modern-day map of Normandy, France.

In one embodiment, the database 1315 is in a central location. In one embodiment, the database 1315 is distributed across a network of nodes. In one embodiment, the database 1315 is distributed across individual units (e.g., individual game consoles).

Figure 14:
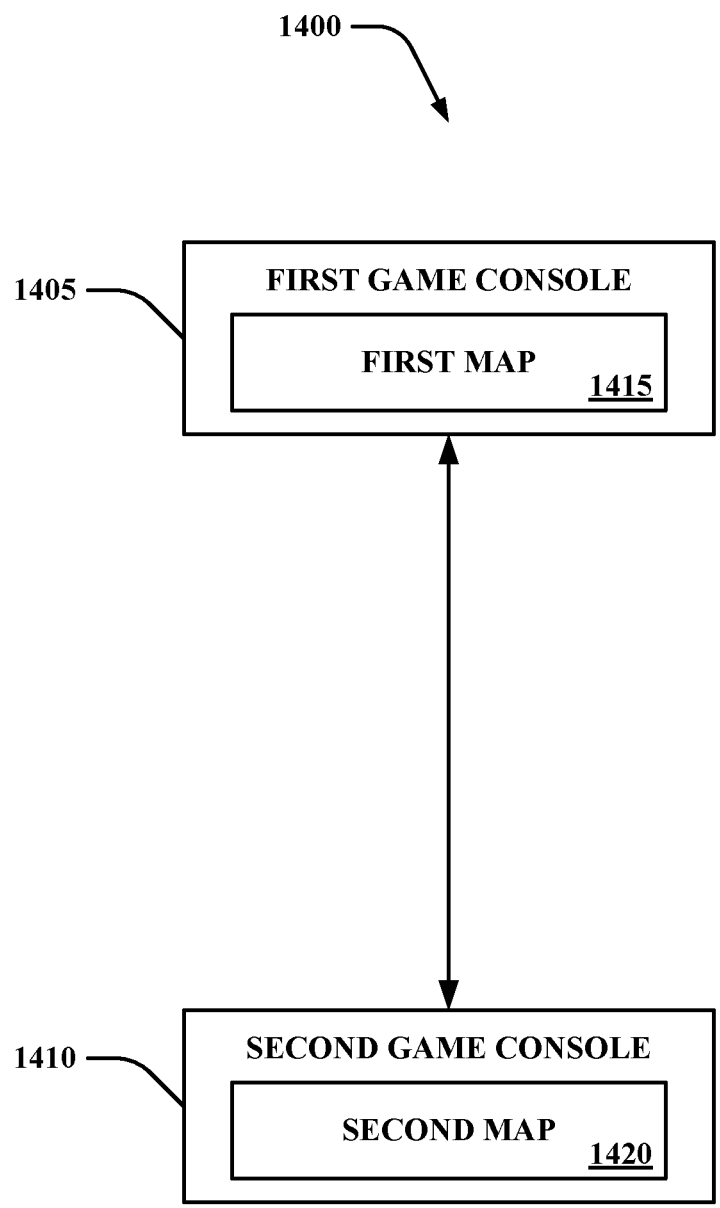
FIG. 14 illustrates one embodiment of a network.

FIG. 14 illustrates one embodiment of a network 1400. The network 1400 can include a first game console 1405 and a second game console 1410. The first game console 1405 and/or the second game console 1410 can incorporate the analysis component 105 of FIG. 1, production component 110 of FIG. 1, the collection component 605 of FIG. 6, and/or the render component 610 of FIG. 6 (e.g., a combination thereof). The first game console 1405 can retain a first map 1415 and the second game console 1410 can retain a second map 1420. The network 1400 can be a local network, a network over the Internet, and others. While shown with two game consoles and two maps, it is to be appreciated that the network 1400 can include more than two game consoles, more than two maps, any one particular game console can retain more than one map, and others.

The network 1400 can function such that individual game consoles can have access to a vast amount of maps while retaining relatively few maps locally. In one example, the first game console 1405 retains first map 1415 locally. However, first game console 1405 can have access to the second map 1420 retained on second game console 1410.

In one embodiment, a player using first game console 1405 can request to play second map 1420. A permission and/or security check can occur and based on a positive result, the player can play second map 1420. In one example, a check is made to determine if the player using first game console 1405 makes first map 1415 available to other game consoles. Sharing or exchange schemes can be enforced according to ratios, purchase, bargaining, trading, credits or money, and other methods of map-swapping including user preferences, map popularity and availability, resource intensity or size, relationship or friend status, necessity (e.g., to play in a tournament or with friends), and a variety of other techniques. In an embodiment, one user can give a specific map away for free while another requires an exchange. In one embodiment, users are designated to offer the same map (or other information) for the same value.

In one embodiment, the first map 1415 and the second map 1420 are maps depicting a specific location (e.g., both maps are of Lake Erie). The maps can be identical or be different (e.g., one map is of a higher quality than the second map, the maps have contrasting information, the first map 1415 is configured for a fishing game and has a relatively large amount of fishing data while the second map 1420 is boating map that has a relatively large amount of wave information, and others). A search can occur for a map of the specific location. A component can determine which map to access. In one example, if the maps are identical, then a component can select a map (e.g., a cheaper map can be selected, a map that can be downloaded faster can be selected, and others). In one example, if the maps are different, then a component can select a map (e.g., if a player wants to used a searched map a fishing game, then the first map 1415 is selected; if the player wants to use the searched map in an first person shooter game, then a determination can be made on which map can be more easily converted and/or has more useful metadata (e.g., wave information that can impact travelling on the water) and that map can be selected; and others).

In one embodiment, second map 1420 is downloaded onto first game console 1405 and retained (e.g., saved after play is completed, temporarily retained until done playing, and/or others). In one embodiment, the first game console 1405 can play the second map 1420 while keeping the second map 1420 on the second game console 1410. In one embodiment, maps (e.g., first map 1415 and second map 1420) are distributed among game consoles (e.g., first game console 1405 and second game console 1410) and/or other locations (e.g., databases). In one embodiment, in response to a request by a player on first game console 1405 to play second map 1420, second map 1420 can be retained on first game console 1405 and first map 1415 can be removed off first game console 1405 and retained on second game console 1410 (e.g., first game console 1405 and second game console 1410 switch locally-stored maps).

In one embodiment, first map 1415 and second map 1420 can be gaming maps for use in a shooter video game (e.g., first-person shooter). In one embodiment, first map 1415 and second map 1420 can be based on real-world areas and rendered by the system 100 of FIG. 1. In one example, first map 1415 can be used in a real-world combat simulation game of a city in Iraq and second map 1420 can be used in a fictional space invasion combat arcade game. The system 100 of FIG. 1 can use a component to modify (e.g., intelligently modify) a map to make a map more game combat friendly. In an embodiment, first map 1415 can be used on first game console 1405 as a racing video game map, and used on second game console 1410 as a shooter video game map. Features (e.g. resolution, detail, background interaction, background behavior, and others) can be adjusted to better accommodate the particular gaming (or other) context to which a particular map is applied. In one embodiment, a map can be converted from a first type (e.g., a shooter map) to a second type (e.g., a racing map).

A security component can be used to determine if rendering should occur, to stop a rendering from occurring, and others. In one example, a child can request that a map be rendered of his school for a first-person shooter game. While the map may be rendered from available information (e.g., information from a map application, publically available blueprints, photographs from a social networking site that show decorations, content from a school website, academic or educational games and applications, and others), there may be a social desire to not enable a student to play a game where shootings can happen in school. Therefore, the security component can stop the rendering from occurring, report the requested rendering, stop the rendering if the requestor meets a metric (e.g., is a student at the school, is underage, and others), and others. In one embodiment, the security component is integrated as part of the production component 110 of FIG. 1.

The following methodologies are described with reference to figures depicting the methodologies as a series of blocks. These methodologies may be referred to as methods, processes, and others. While shown as a series of blocks, it is to be appreciated that the blocks can occur in different orders and/or concurrently with other blocks. Additionally, blocks may not be required to perform a methodology. For example, if an example methodology shows blocks 1, 2, 3, and 4, it may be possible for the methodology to function with blocks 1-2-4, 1-2, 3-1-4, 2, 1-2-3-4, and others. Blocks may be wholly omitted, re-ordered, repeated or appear in combinations not depicted. Individual blocks or groups of blocks may additionally be combined or separated into multiple components. Furthermore, additional and/or alternative methodologies can employ additional, not illustrated blocks, or supplemental blocks not pictured can be employed in some models or diagrams without deviating from the spirit of the features. In addition, at least a portion of the methodologies described herein may be practiced on a computer-readable medium storing computer-executable instructions that when executed by a computer cause the computer to perform a methodology (e.g., method).

Figure 15:
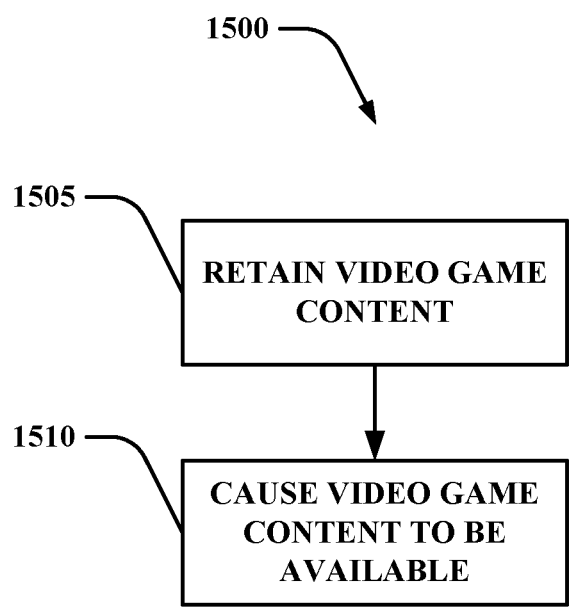
FIG. 15 illustrates one embodiment of a method that includes retaining a video game content at a first location and causing the video game content to be available to a second location.

FIG. 15 illustrates one embodiment of a method 1500 that includes retaining a video game content at a first location 1505 and causing the video game content to be available to a second location 1510. The method 1500 can function in association with the network 1400 of FIG. 14. In one embodiment, the first game console 1405 of FIG. 14 can be the first location, the second game console 1410 of FIG. 14 can be the second location, the first map 1415 of FIG. 14 and/or the second map 1420 of FIG. 14 can be the video game content. In one embodiment, the video game content (e.g., rendered map 120 of FIG. 1, video game output 630 of FIG. 6, etc.) can be produced and then retained at 1505 by the production component 110 of FIG. 1 (e.g., retained in a computer-readable medium, retained in a computer-readable medium by a processor functioning as the production component 110 of FIG. 1). In one embodiment, the production component 110 of FIG. 1 causes the video game content to be available at 1510

In one embodiment, the first location 1505 is a first video game console, the second location 1510 is a second video game console, and the first video game console is remote to the second video game console. In one embodiment, the video game content is distributed across the first location 1505 and the second location 1510 and/or stored at the first location 1505 or second location 1510 alone. In one embodiment, the video game content is a video game map. In one embodiment, the video game content is created at the first location 1505. In one embodiment, the video game content is created at the second location 1510. In one embodiment, the video game content is created at a separate location (e.g., a computer system at a company office that is then sent to the first location 1505). In one embodiment, the video game content is a first video game content (e.g., the first map 1415 of FIG. 14) and where the second video game console (e.g., the second game console 1410 of FIG. 14) retains a second video game content (e.g., the second map 1420 of FIG. 14) that is available to the first video game console (e.g., the first game console 1405 of FIG. 14).

Figure 16:
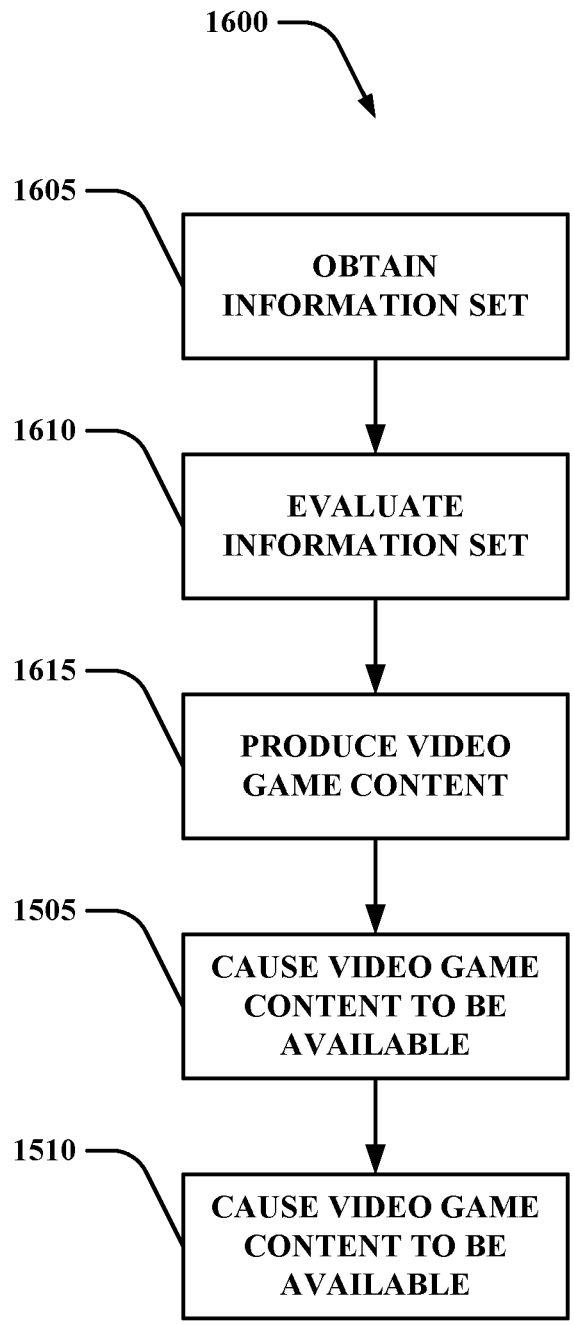
FIG. 16 illustrates one embodiment of a method that includes retaining a video game content at a first location and causing the video game content to be available to a second location.

FIG. 16 illustrates one embodiment of a method 1600 that includes retaining a video game content at the first location 1505 of FIG. 15 and causing the video game content to be available to the second location 1510 of FIG. 15. At 1605, a physical information set is obtained (e.g., in response for a video game content request from entered at the first location 1505 of FIG. 15). In one embodiment, the physical information is obtained by the collection component 605 of FIG. 6. At 1610, the physical information set is evaluated. This evaluation can be performed by the analysis component 105 of FIG. 1 and/or the examination component 1105 of FIG. 11. The video game content can be produced at 1615. This production can be based, at least in part, on a result from evaluating the physical information set at 1610. In one embodiment, this production can be performed by the production component 110 of FIG. 1 and/or the render component 610 of FIG. 6.

Figure 17:
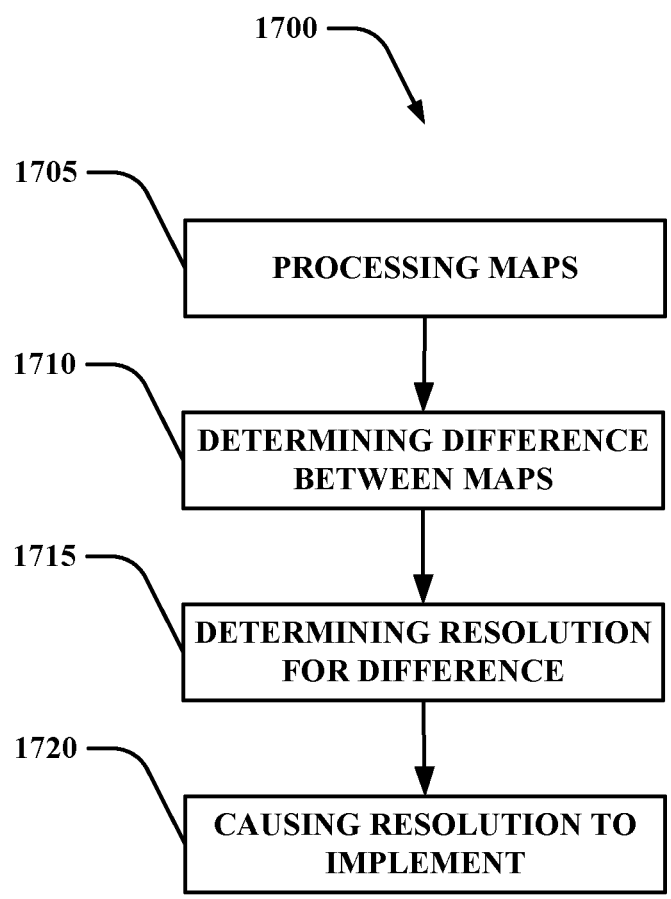
FIG. 17 illustrates one embodiment of a method that resolves a difference between maps.

FIG. 17 illustrates one embodiment of a method 1700 that resolves a difference between maps. At 1705, the method 1700 can process maps (e.g., collect maps, evaluate maps, compare maps against one another, compare maps against other information, and others). Based on map processing, a determination can be made on map differences at 1710 (e.g., if at least one map difference exists, why a map difference exists, and others). At 1715, a determination can be made on how to resolve a map difference. At 1720, a resolution to resolve the map difference can be caused to implement (e.g., send an instruction to the production component 110 of FIG. 1 on how to create a map, the production component 110 of FIG. 1 makes the resolution, etc.). In one embodiment, a solution to resolve the map difference can be tested before implementation.

Figure 18:
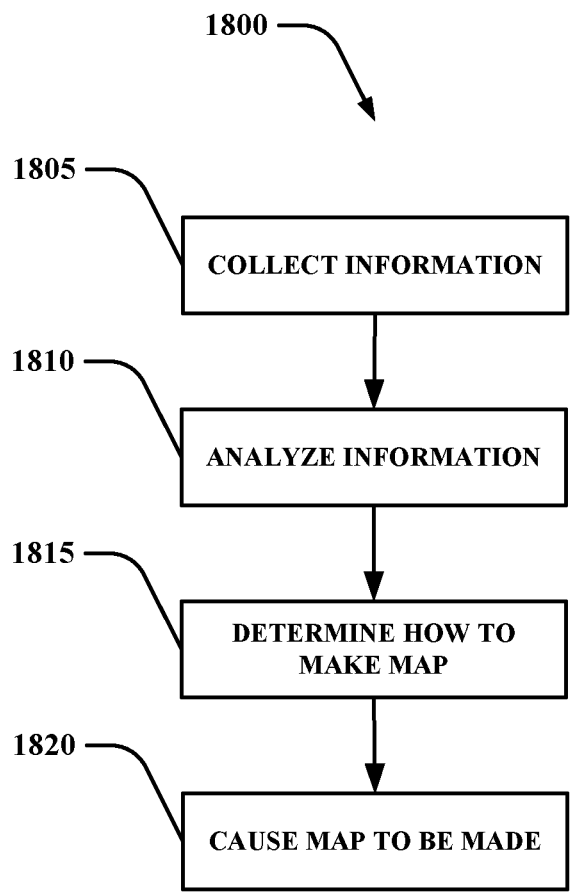
FIG. 18 illustrates one embodiment of a method that causes a map to be made.

FIG. 18 illustrates one embodiment of a method 1800 that causes a map to be made (e.g., a new map to be created, a map to be modified, a map to be replaced, and others). Information (e.g., the map data set 115 of FIG. 1) can be collected at 1805. Information can include map application information, request information, information found off the Internet and others. Information can be collected passively (e.g., sent to a computer-readable medium operating the method 1800) and/or actively (e.g., the computer-readable medium operating the method 1800 seeks out information).

The information can be analyzed at 1810. At 1815, a determination can be made on how to make a map (e.g., based on a result of the analysis). In one embodiment, the information collected at 1805 includes instructions and/or format data for a device that may ultimately use the map. At 1820, a map can be caused to be made (e.g., according to a manner determined at 1815). In one embodiment, the map can be made and caused to be displayed, caused to be used in an application (e.g., software application), and others.

Figure 19:
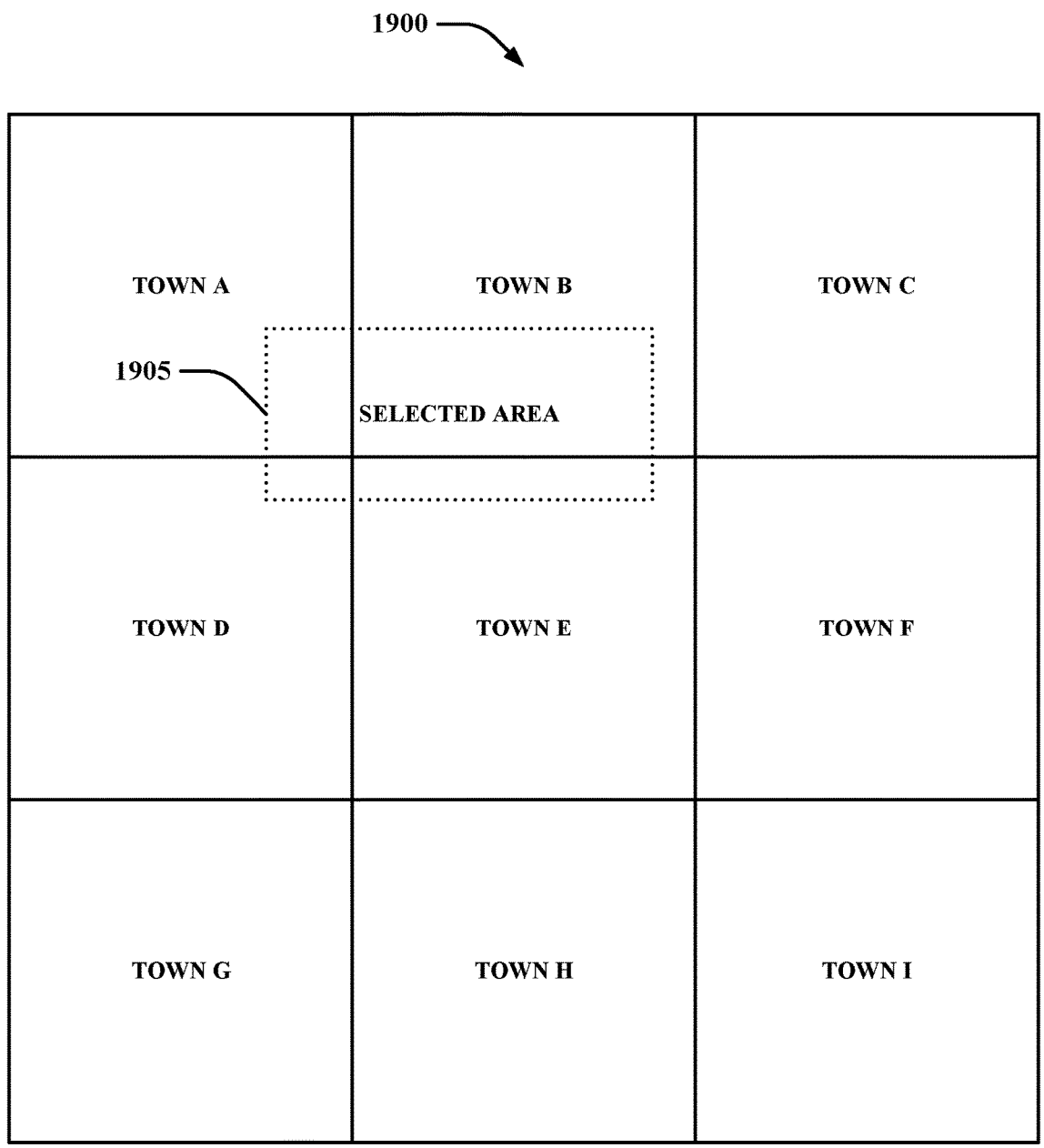
FIG. 19 illustrates one embodiment of a town grouping.

FIG. 19 illustrates one embodiment of a town grouping 1900. The town grouping 1900 can include various towns (e.g., Towns A-I). In one example, the town grouping 1900 represents a larger organization (e.g., Towns A-I form a county J).

An interface can be presented to a person that enables the person to designate an area for rendering (e.g., by the production component 110 of FIG. 1, by the render component 610 of FIG. 6, etc.). In one example, the person can access a personal computer and use a mouse and keyboard to designate a selected area 1905. A map of the selected area 1905 can be rendered and transferred (e.g., to a personal computer, to a game console, to a computer-readable medium, and others). While shown as a rectangle, it is to be appreciated that the selected area can be various shapes and/or arrangements.

In addition, a map can be rendered with a three-dimensional component (e.g., render from ground level to 'x' distance in the air). The selected area 1905 can designate a third dimensional limit and/or one can be inferred. As described above, maps can be altered to fit a particular usage context. For example, one usage can be entirely two-dimensional, another can be three-dimensional wherein the third dimension is treated as background or environment, and still another usage context can involve travel through three dimensions wherein the third dimension is actively engaged with the particular use.

Additionally, an inference can be drawn on how to render map boundaries (e.g., how high to make a third dimension). In one embodiment, a map can be rendered for a racing game. In this embodiment, rendering can be limited to a height of an upper limit of a car windshield. In one embodiment, for specific situations (e.g., an in-game car flips over), a more generic setting can be shown (e.g., non-accurately rendered, but resembling other scenery).

Figure 20:
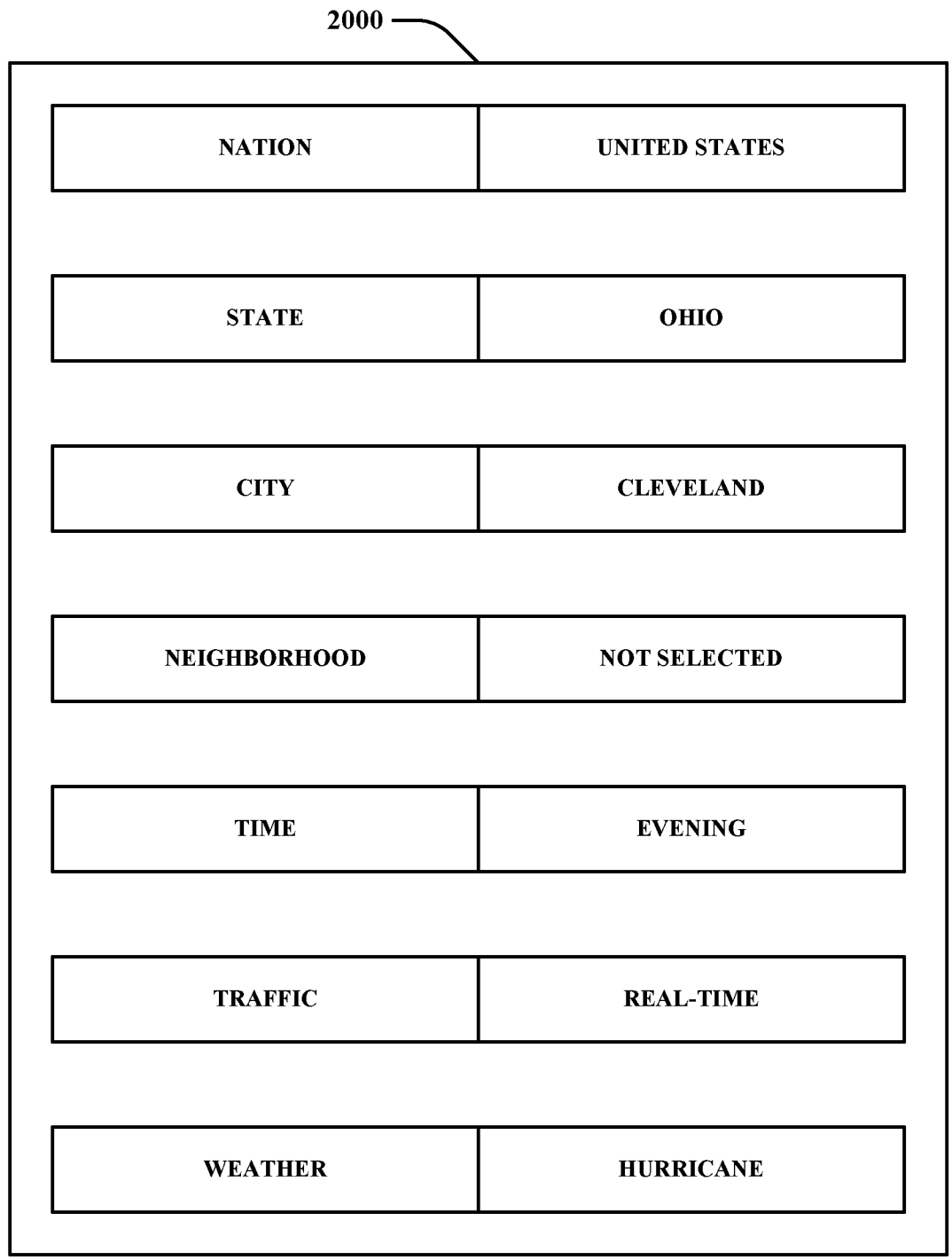
FIG. 20 illustrates one embodiment of an interface.

FIG. 20 illustrates one embodiment of an interface 2000. A creation component can create the interface 2000 and the interface can be disclosed (e.g., caused to be disclosed). In one embodiment, the creation component is part of the system 1000 of FIG. 10 and the interface facilitates the request 1025 (e.g., by filling out the interface 2000, the request 1025 is generated). Disclosure of the interface 2000 can occur in response to a command, in response to an inference (e.g., conversation of players wishing they could play a game on a particular circuit), and others. The creation component can identify information that could be beneficial in knowing to create a map and produce the interface 2000. In one embodiment, a person creates the interface 2000 (e.g., a programmer, a player, and others). At least some fields of the interface 2000 can be populated with data and based, at least in part, on the data a map can be rendered.

Figure 21:
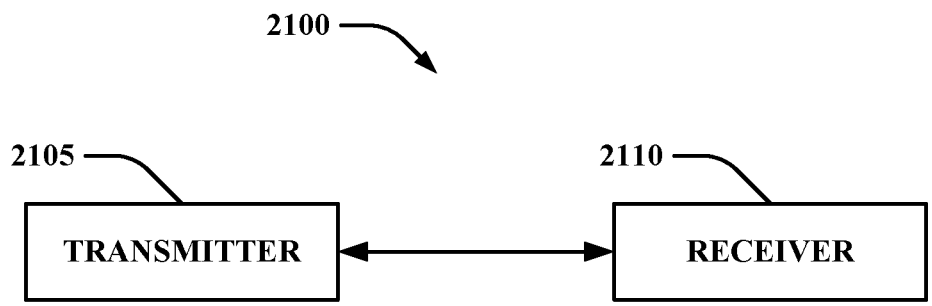
FIG. 21 illustrates one embodiment of a system that may be used in practicing at least one aspect disclosed herein.

FIG. 21 illustrates one embodiment of a system 2100 that may be used in practicing at least one aspect disclosed herein. The system 2100 includes a transmitter 2105 and a receiver 2110. In one or more embodiments, the transmitter 2105 can include reception capabilities and/or the receiver 2110 can include transmission capabilities. In one embodiment, the system 100 of FIG. 1 includes the transmitter 2105 and/or the receiver 2110. In one embodiment, the receiver 2110 integrates with and/or functions as the collection component 605 of FIG. 6 and the transmitter 2105 integrates with and/or functions as the render component 610 of FIG. 6. In one embodiment, the system 100 of FIG. 1 and/or the system 600 of FIG. 6 integrate with the system 2100 on a mobile device.

The transmitter 2105 and receiver 2110 can each function as a client, a server, and others. The transmitter 2105 and receiver 2110 can each include a computer-readable medium used in operation. The computer-readable medium may include instructions that are executed by the transmitter 2105 or receiver 2110 to cause the transmitter 2105 or receiver to perform a method. The transmitter 2105 and receiver 2110 can engage in a communication with one another. This communication can over a communication medium. Example communication mediums include an intranet, an extranet, the Internet, a secured communication channel, an unsecure communication channel, radio airwaves, a hardwired channel, a wireless channel, and others. Example transmitters 2105 include a base station, a personal computer, a cellular telephone, a personal digital assistant, and others. Example receivers 2110 include a base station, a cellular telephone, personal computer, personal digital assistant, and others. The example system 2100 may function along a Local Access Network (LAN), Wide Area Network (WAN), and others. The aspects described are merely an example of network structures and intended to generally describe, rather than limit, network and/or remote applications of features described herein.

Figure 22:
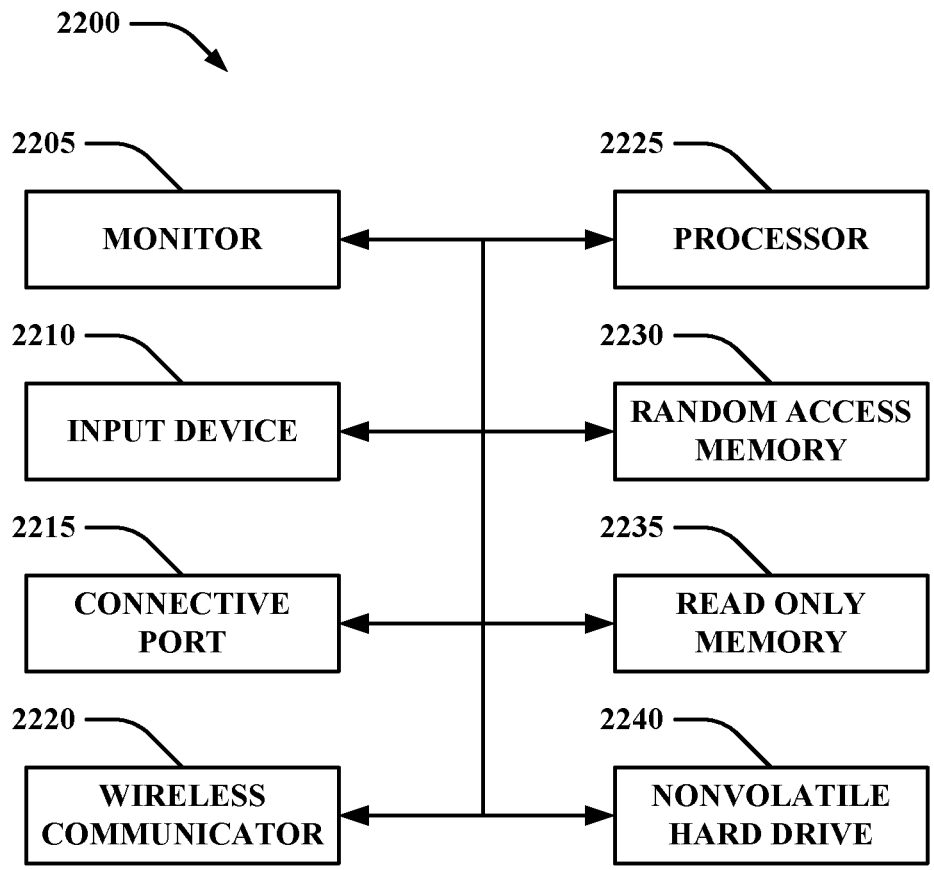
FIG. 22 illustrates one embodiment of a system, upon which at least one aspect disclosed herein can be practiced.

FIG. 22 illustrates one embodiment of a system 2200, upon which at least one aspect disclosed herein can be practiced. In one embodiment, the system 2200 can be considered a computer system that can function in a stand-alone manner as well as communicate with other devices (e.g., a central server, communicate with devices through data network (e.g., Internet) communication, etc). Information can be displayed through use of a monitor 2205 and a user can provide information through an input device 2210 (e.g., keyboard, mouse, touch screen, etc.). In one embodiment, the monitor 2205 displays the interface 2000 of FIG. 20. A connective port 2215 can be used to engage the system 2200 with other entities, such as a universal bus port, telephone line, attachment for external hard drive, and the like. Additionally, a wireless communicator 2220 can be employed (e.g., that uses an antenna) to wirelessly engage the system 2200 with another device (e.g., in a secure manner with encryption, over open airwaves, and others). A processor 2225 can be used to execute applications and instructions that relate to the system 2200. In one example, the processor 2225 executes at least one instruction associated with at least one of the analysis component 105 of FIG. 1 or the production component 110 of FIG. 1. In one example, the processor 2225 executes at least one instruction associated with at least one of the collection component 605 of FIG. 6 or the render component 610 of FIG. 6. Storage can be used by the system 2200. The storage can be a form of a computer-readable medium. Example storage includes random access memory 2230, read only memory 2235, or nonvolatile hard drive 2240. In one embodiment, a memory (e.g., at least one of the random access memory 2230, read only memory 2235, and/or the nonvolatile hard drive 2240) retains instructions that cause a method disclosed herein to operate. In one embodiment, the memory retains a database in accordance with at least one aspect disclosed herein.

The system 2200 may run program modules. Program modules can include routines, programs, components, data structures, logic, etc., that perform particular tasks or implement particular abstract data types. The system 2200 can function as a single-processor or multiprocessor computer system, minicomputer, mainframe computer, laptop computer, desktop computer, hand-held computing devices, microprocessor-based or programmable consumer electronics, and the like.

It is to be appreciated that aspects disclosed herein can be practiced through use of artificial intelligence techniques. In one example, a determination or inference described herein can, in one embodiment, be made through use of a Bayesian model, Markov model, statistical projection, neural networks, classifiers (e.g., linear, non-linear, etc.), using provers to analyze logical relationships, rule-based systems, or other technique.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, innovative aspects are not limited to the specific details, the representative apparatus, and illustrative examples shown and described. Thus, this application is intended to embrace alterations, modifications, and variations that fall within the scope of the appended claims.

Functionality described as being performed by one entity (e.g., component, hardware item, and others) may be performed by other entities, and individual aspects can be performed by a plurality of entities simultaneously or otherwise. For example, functionality may be described as being performed by a processor. One skilled in the art will appreciate that this functionality can be performed by different processor types (e.g., a single-core processor, quad-core processor, etc.), different processor quantities (e.g., one processor, two processors, etc.), a processor with other entities (e.g., a processor and storage), a non-processor entity (e.g., mechanical device), and others.

In addition, unless otherwise stated, functionality described as a system may function as part of a method, an apparatus, a method executed by a computer-readable medium, and other embodiments may be implemented in other embodiments. In one example, functionality included in a system may also be part of a method, apparatus, and others.

Where possible, example items may be combined in at least some embodiments. In one example, example items include A, B, C, and others. Thus, possible combinations include A, AB, AC, ABC, AAACCCC, AB, ABCD, and others. Other combinations and permutations are considered in this way, to include a potentially endless number of items or duplicates thereof.

What is claimed is:

1. A non-transient computer-readable medium storing computer-executable instructions that when executed by a computer cause the computer to perform a method, the method comprising:
   identifying initialization of a first video game racing session at a first point in time, the first video game racing session is to play on a racing track;
   determining a first weather for the racing track that corresponds to the first point in time;
   causing the first video game racing session to render the racing track such that the surface of the racing track corresponds to a response the racing track has to the first weather;
   identifying initialization of a second video game racing session at a second point in time, the second video game racing session is to play on a racing track;
   determining a second weather for the racing track that corresponds to the second point in time; and
   causing the second video game racing session to render the racing track such that the surface of the racing track corresponds to a response the racing track has to the second weather,
   where the second point in time is after the first point in time,
   where there is a difference between the first weather and the second weather, and
   where there is a difference between the response the racing track has to the first weather and the response the racing track has to the first weather.

2. The computer-readable medium of claim 1,
   where the response the racing track has to the first weather comprises a first amount of precipitation on the surface, the first amount being equal to or greater than zero,
   where the response the racing track has to the second weather comprises a second amount of precipitation on the surface, the second amount being equal to or greater than zero,
   where there is a difference between the first amount and the second amount,
   where a first vehicle of the first video game racing session responds to the surface with the first amount of precipitation in a first manner,
   where a second vehicle of the second video game racing session responds to the surface with the second amount of precipitation in a second manner,
   where there is a difference between the first manner and the second manner, and
   where the first vehicle and the second vehicle are the same vehicle.

3. The computer-readable medium of claim 1,
   where the response the racing track has to the first weather comprises the surface being at a first temperature for at least a portion,
   where the response the racing track has to the second weather comprises the surface being at a second temperature for at least a portion,
   where there is a difference between the first temperature and the second temperature,
   where a first vehicle of the first video game racing session responds to the surface at the first temperature in a first manner,
   where a second vehicle of the second video game racing session responds to the surface at the second temperature in a second manner,
   where there is a difference between the first manner and the second manner, and
   where the first vehicle and the second vehicle are the same vehicle.

4. The computer-readable medium of claim 1,
   where the first weather is a first real-time-based weather,
   where the second weather is a first real-time-based weather,
   where the causing the first video game racing session to render the racing track occurs on a single gaming console, and
   where the causing the second video game racing session to render the racing track occurs on the same gaming console.

5. The computer-readable medium of claim 1,
   where the first weather is a first real-time-based weather,
   where the second weather is a first real-time-based weather,
   where the determining the first weather occurs from access of an Internet-based weather information source,
   where the determining the second weather occurs from access of the Internet-based weather information source,
   where the causing the first video game racing session to render the racing track is propagated upon a first gaming location remote to the computer-readable medium, and
   where the causing the second video game racing session to render the racing track is propagated upon a second gaming location remote to the computer-readable medium and remote to the first gaming location.

6. A system, that is at least partially hardware, comprising:
   a selection component configured to identify a selection by a user for a video game playable area to be rendered with a real-time weather for a sports video game;
   a determination component configured to determine a real-world location associated with the video game playable area;

an identification component configured to identify the real-time weather for the real-world location in response to when the user makes the selection; and
a render component configured to render a video game playable area representative of the real-world location subjected to the real-time weather,
where the render component is configured to render the video game playable area representative of the real-world location subjected to the real-time weather by, at least in part, loading a stored version of the video game playable area representative of the real-world location.

7. The system of claim 6,
where the sports video game is a racing video game where a vehicle set drives with a tire set upon a racing surface,
where the racing surface is, at least part of, the video game playable area, and
where the real-time weather impacts the racing surface.

8. The system of claim 7,
where the real-time weather causes a removal of a tire remnant of the vehicle set from the racing surface.

9. The system of claim 8,
where the removal of the tire remnant causes a level of the tire remnant to drop from a first level to a second level,
where the first level is greater than zero,
where the second level is greater than zero,
and where the level of the tire remnant influences performance of the vehicle set.

10. The system of claim 7,
where the real-time weather causes a temperature change to the racing surface from a first temperature to a second temperature and
where the vehicle set performs differently on the racing surface with the first temperature than on the racing surface with the second temperature.

11. The system of claim 7, comprising:
an inference component configured to perform an inference of a track temperature for the racing surface,
where the inference is based, at least in part, on the real-time weather and
where the render component renders the racing surface with the inferred track temperature.

12. The system of claim 7,
where the real-time weather impacts a temperature of the racing surface,
where the vehicle set driving on the racing surface impacts the temperature of the racing surface,
where the render component is configured to render the racing surface with a temperature in accordance with the real-time weather and a result from the vehicle set driving on the racing surface.

13. The system of claim 7,
where the racing surface comprises a first section and a second section,
where the render component, in response to the real-time weather, is configured to render the first section with a first temperature,
where the render component, in response to the real-time weather, is configured to render the second section with a second temperature, and
where the first temperature and the second temperature are different temperatures.

14. The system of claim 7, comprising:
a choice component configured to choose a surface temperature of the racing surface,
where the determination component is configured to determine a surface type for the racing surface,
where the real-time weather comprises a real-time air temperature,
where the choice of the surface temperature is based, at least in part, on the real-time air temperature and the surface type, and
where the render component renders the racing surface with the chosen surface temperature.

15. The system of claim 7, comprising:
a choice component configured to choose a surface temperature of the racing surface,
where the determination component is configured to determine a surface type for the racing surface,
where the real-time weather comprises a level of sun exposure,
where the choice of the surface temperature is based, at least in part, on the level of sun exposure and the surface type, and
where the render component renders the racing surface with the chosen surface temperature.

16. The system of claim 6,
where the video game playable area is employable in a gaming session,
where the identification component is configured to, during the gaming session, identify a change in the real-time weather, and
where the render component is configured to update the video game playable area to reflect the change in the real-time weather.

17. A system, that is at least partially hardware, comprising:
a determination component configured to determine a real-world location designated for play in a racing video game;
an identification component configured to identify a weather for the real-world location designated for play; and
a render component configured to render a racing surface representative of the real-world location subjected to weather such that the racing surface has a temperature reflective of the weather,
where the weather is a first weather,
where the temperature is a first temperature,
where the identification component is configured to identify a change such that the first weather is replaced by a second weather for the real-world location during a racing session,
where the render component is configured to cause the a racing surface representative of the real-world location subjected to have a second temperature replace the first temperature,
where the second temperature is reflective of the second weather,
where an action for a gaming vehicle causes a first response by the gaming vehicle to the racing surface when the racing surface is at the first temperature,
where the action for the gaming vehicle causes a second response by the gaming vehicle to the racing surface when the racing surface is at the second temperature,
where there is a difference between the first temperature and the second temperature, and
where the first response and the second response are different due, at least in part, to the difference between the first temperature and the second temperature.

18. A system, that is at least partially hardware, comprising:
- a determination component configured to determine a real-world location designated for play in a racing video game;
- an identification component configured to identify a weather for the real-world location designated for play;
- a render component configured to render a racing surface representative of the real-world location subjected to weather such that the racing surface has a temperature reflective of the weather; and
- a selection component configured to select a surface temperature of the racing surface,
- where the weather is identified from a recent weather report for the real-world location,
- where the determination component is configured to determine a surface type for the racing surface,
- where the real-time weather comprise a recent air temperature and a recent accumulation of precipitation,
- where the recent accumulation of precipitation is greater than zero,
- where the selection of the surface temperature is based, at least in part, on the recent air temperature, the recent accumulation of precipitation, and the surface type, and
- where the render component renders the racing surface with the selected surface temperature.

* * * * *